(12) United States Patent
Iwasaki

(10) Patent No.: US 10,942,299 B2
(45) Date of Patent: Mar. 9, 2021

(54) LIQUID LENS, LIQUID LENS DRIVING METHOD, IMAGING APPARATUS, AND DISPLAY APPARATUS

(71) Applicant: SONY CORPORATION, Tokyo (JP)

(72) Inventor: Masanori Iwasaki, Kanagawa (JP)

(73) Assignee: Sony Corporaton, Tokyo (JP)

( * ) Notice: Subject to any disclaimer, the term of this patent is extended or adjusted under 35 U.S.C. 154(b) by 140 days.

(21) Appl. No.: 16/307,771

(22) PCT Filed: Jun. 8, 2017

(86) PCT No.: PCT/JP2017/021273
§ 371 (c)(1),
(2) Date: Dec. 6, 2018

(87) PCT Pub. No.: WO2017/221722
PCT Pub. Date: Dec. 28, 2017

(65) Prior Publication Data
US 2019/0187455 A1 Jun. 20, 2019

(30) Foreign Application Priority Data
Jun. 22, 2016 (JP) .............................. JP2016-123595

(51) Int. Cl.
*G02B 3/14* (2006.01)
*G02B 3/00* (2006.01)
*G02B 26/00* (2006.01)
(52) U.S. Cl.
CPC ................ *G02B 3/14* (2013.01); *G02B 3/00* (2013.01); *G02B 26/005* (2013.01)
(58) Field of Classification Search
CPC ................................ G02B 26/005; G02B 3/14

USPC .................................................. 359/665–666
See application file for complete search history.

(56) References Cited

U.S. PATENT DOCUMENTS

| 7,385,755 B2 * | 6/2008 | Hendriks ................. G02B 3/14 |
| | | 359/365 |
| 7,605,984 B2 * | 10/2009 | Yeh ....................... G02B 26/005 |
| | | 359/666 |
| 7,679,833 B2 * | 3/2010 | Kuiper ................. G02B 13/009 |
| | | 359/665 |
| 2002/0196558 A1 | 12/2002 | Kroupenkine et al. |
| 2007/0070509 A1 | 3/2007 | Yeh et al. |
| 2013/0038944 A1 | 2/2013 | Chang et al. |

(Continued)

FOREIGN PATENT DOCUMENTS

| CN | 101097264 A | 1/2008 |
| DE | 60202815 T2 | 1/2006 |
| EP | 1271218 A1 | 1/2003 |

(Continued)

OTHER PUBLICATIONS

International Search Report and Written Opinion of PCT Application No. PCT/JP2017/021273, dated Sep. 5, 2017, 12 pages of ISRWO.

*Primary Examiner* — Zachary W Wilkes
(74) *Attorney, Agent, or Firm* — Chip Law Group

(57) ABSTRACT

Provided is a liquid lens that includes a first electrode and a second electrode to which a predetermined voltage is applied. The second electrode is arranged outside the first electrode in the planar direction, and an insulating film having water repellency is formed on an upper surface of the second electrode.

14 Claims, 27 Drawing Sheets

(56) References Cited

U.S. PATENT DOCUMENTS

2013/0077178 A1    3/2013  Lee et al.

FOREIGN PATENT DOCUMENTS

| EP | 1873560 A2 | 1/2008 |
| JP | 2001-013306 A | 1/2001 |
| JP | 2007-086786 A | 4/2007 |
| KR | 10-2013-0016943 A | 2/2013 |
| KR | 10-2013-0033115 A | 4/2013 |

* cited by examiner

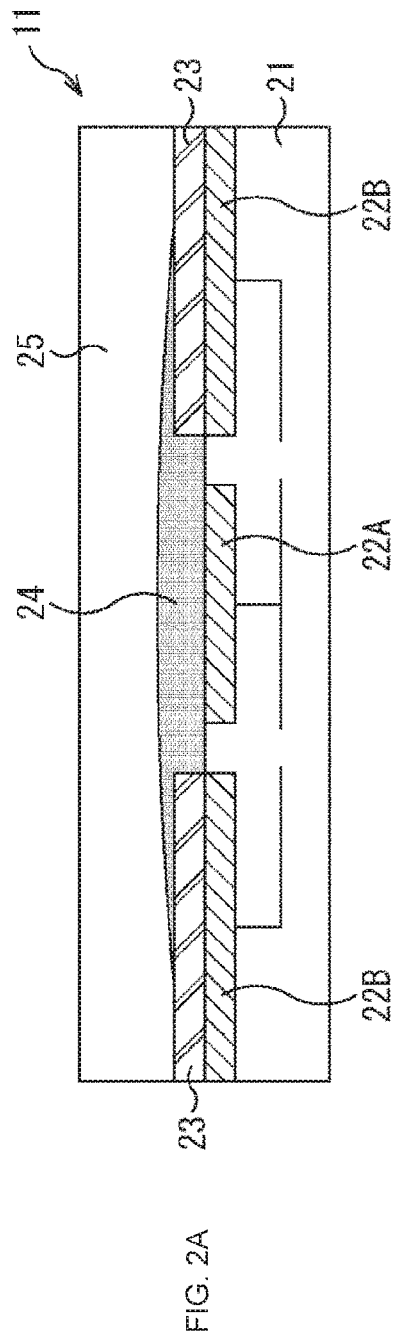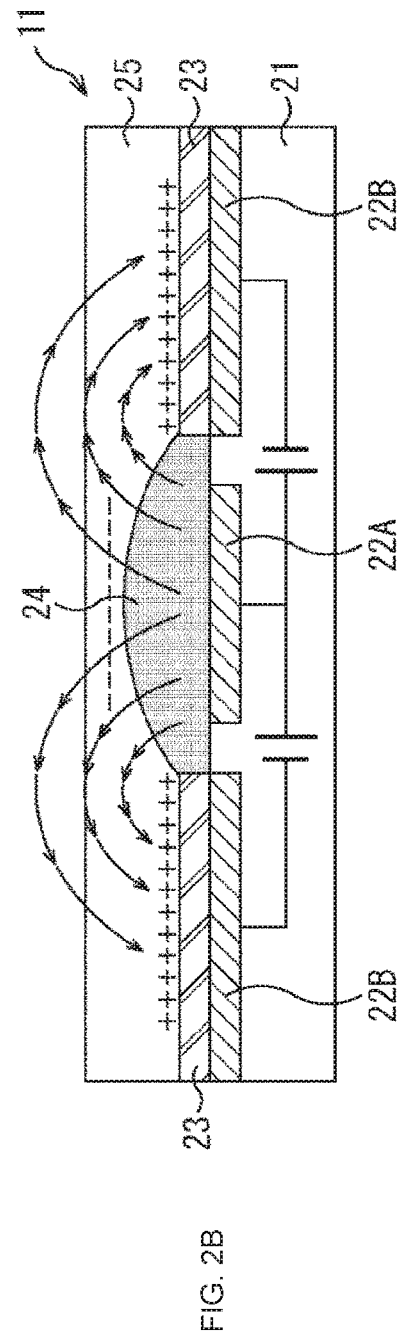

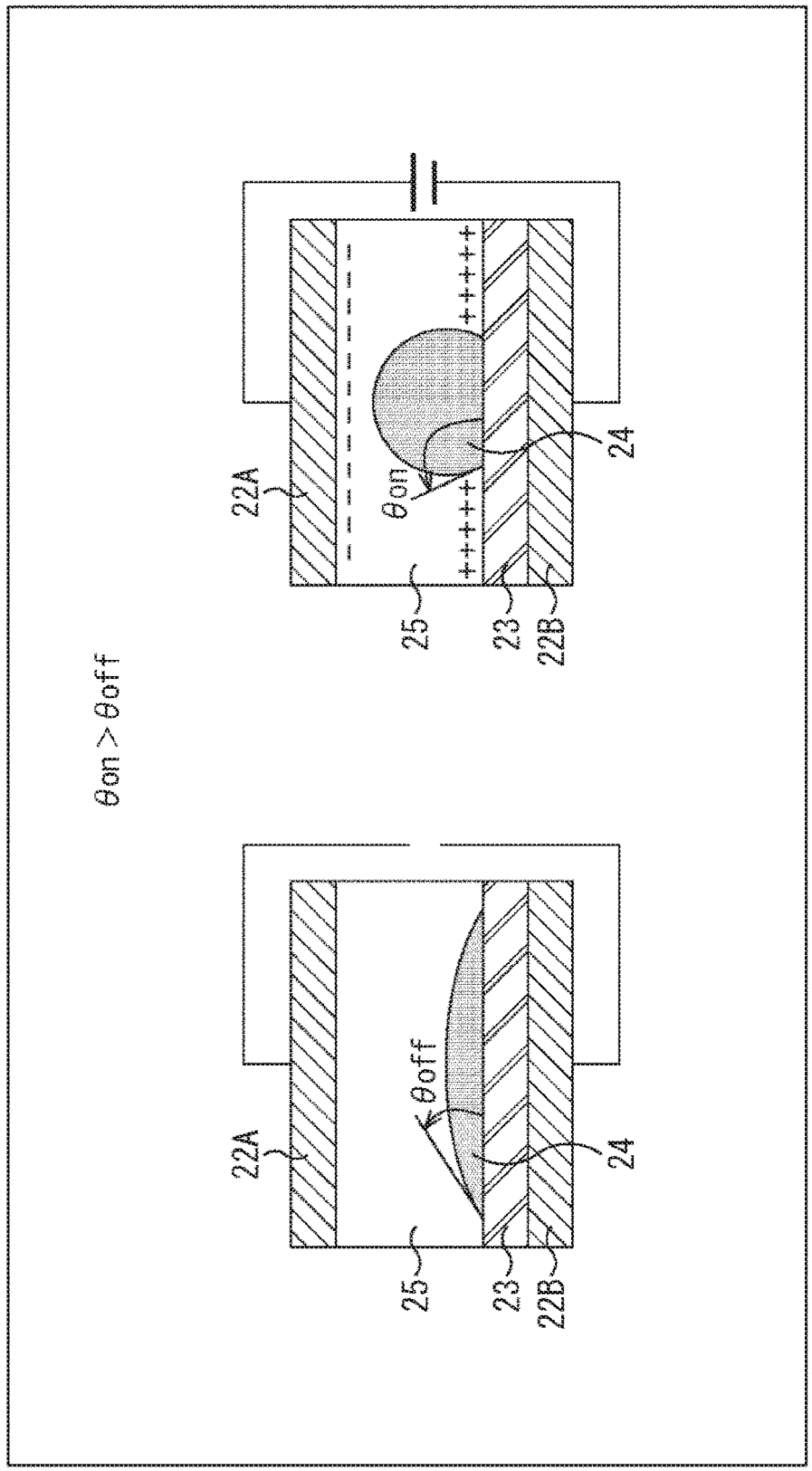

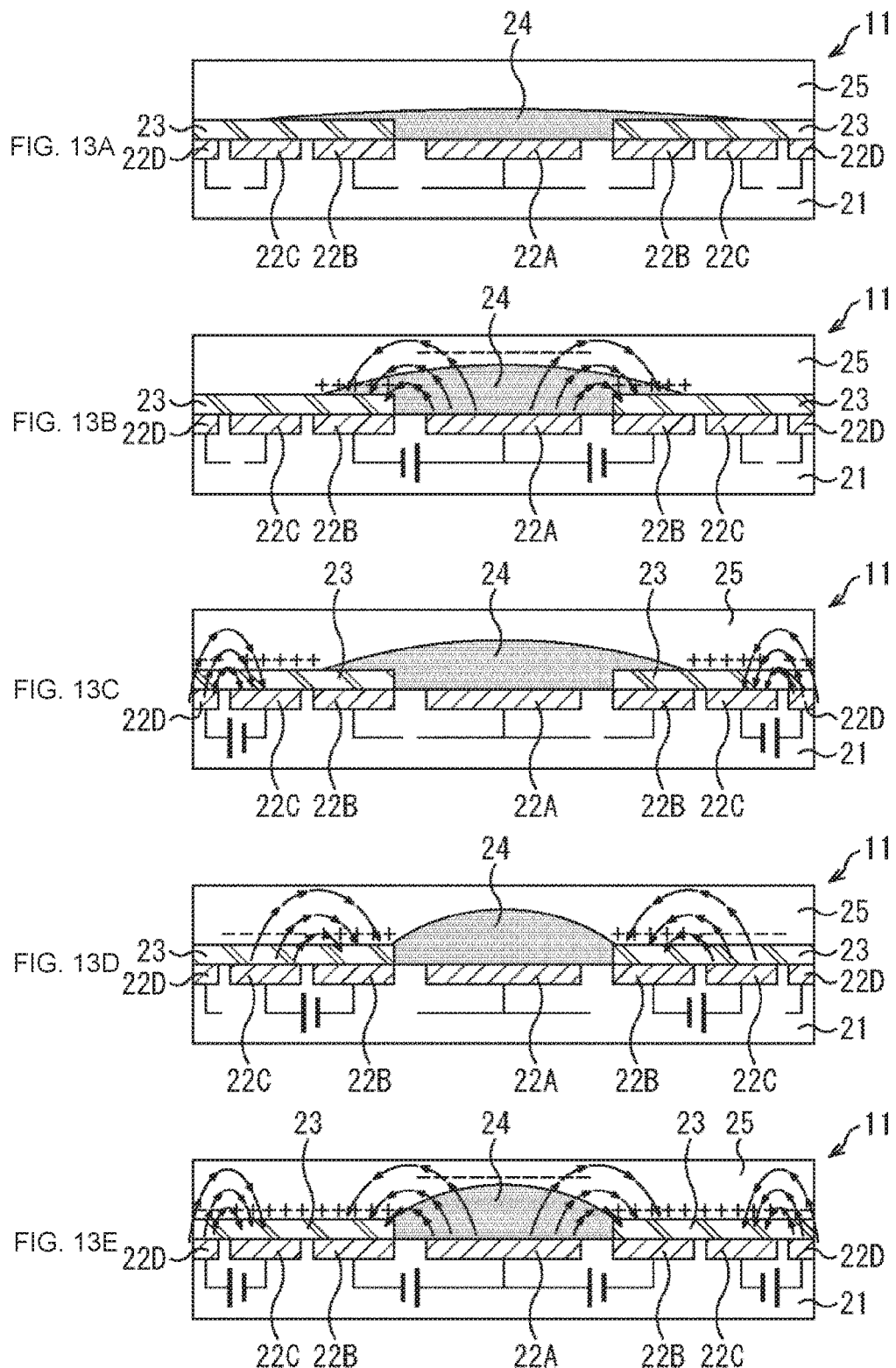

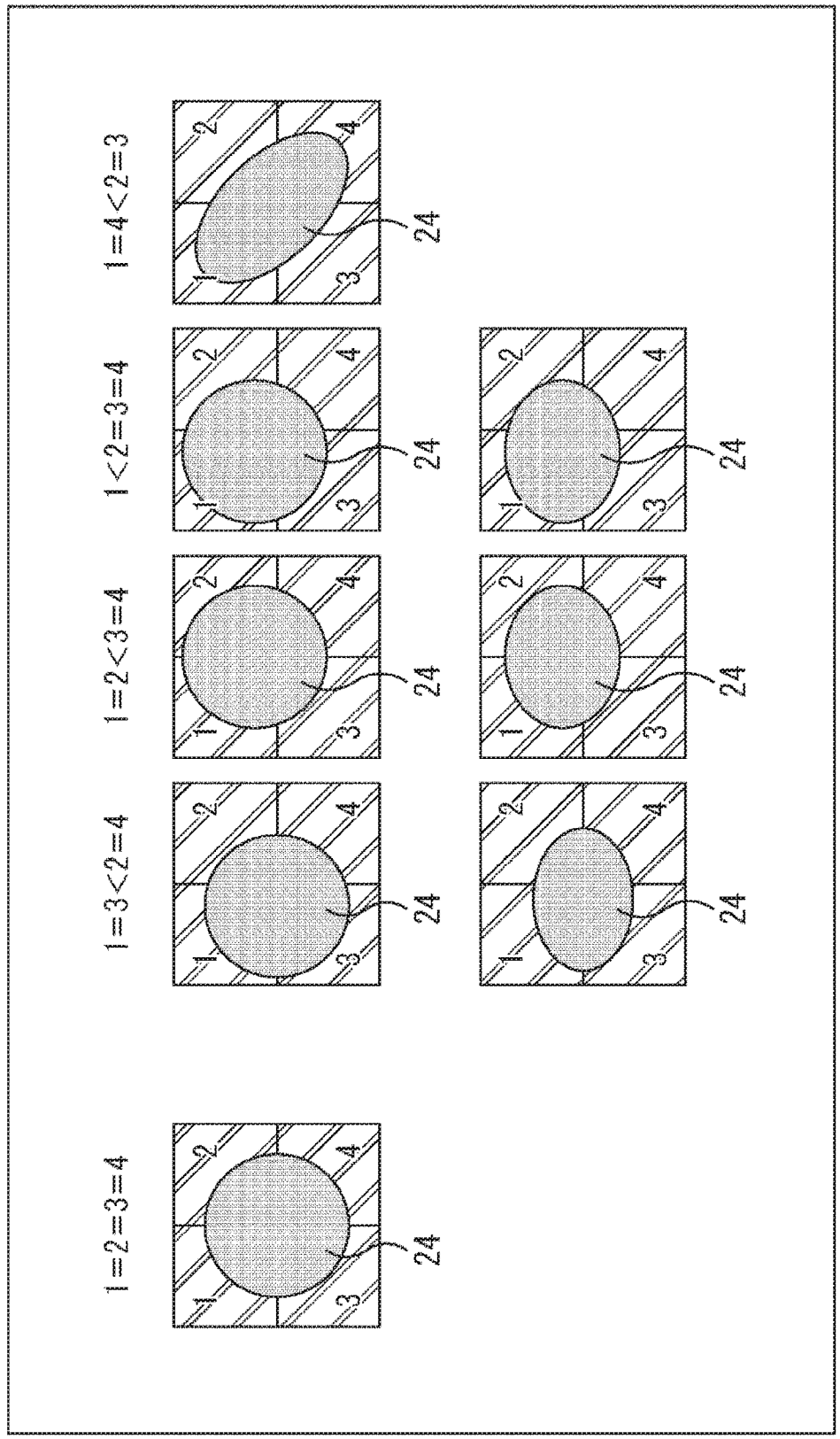

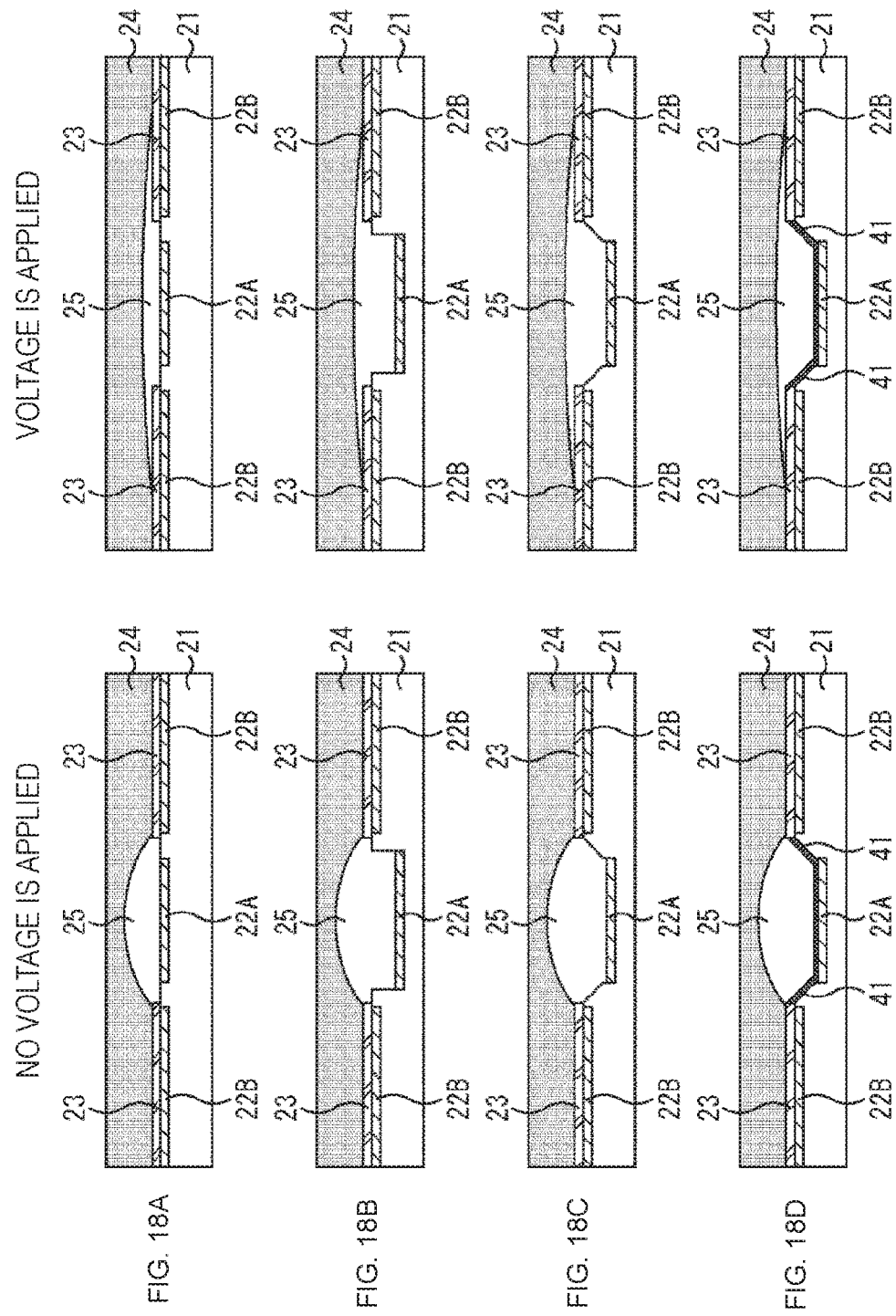

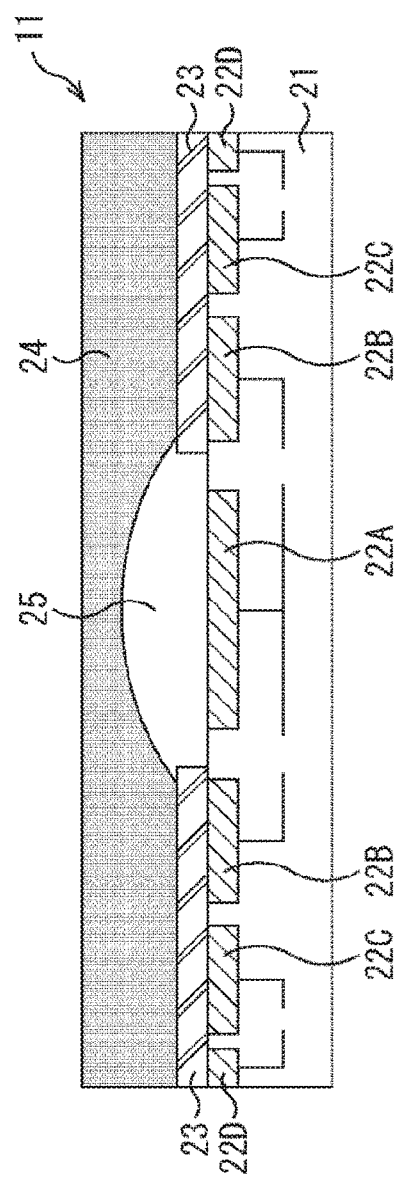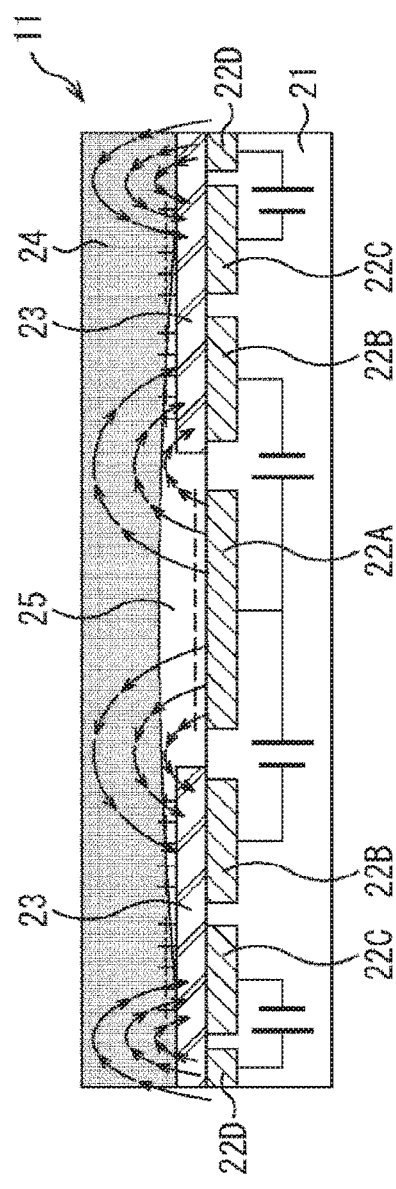

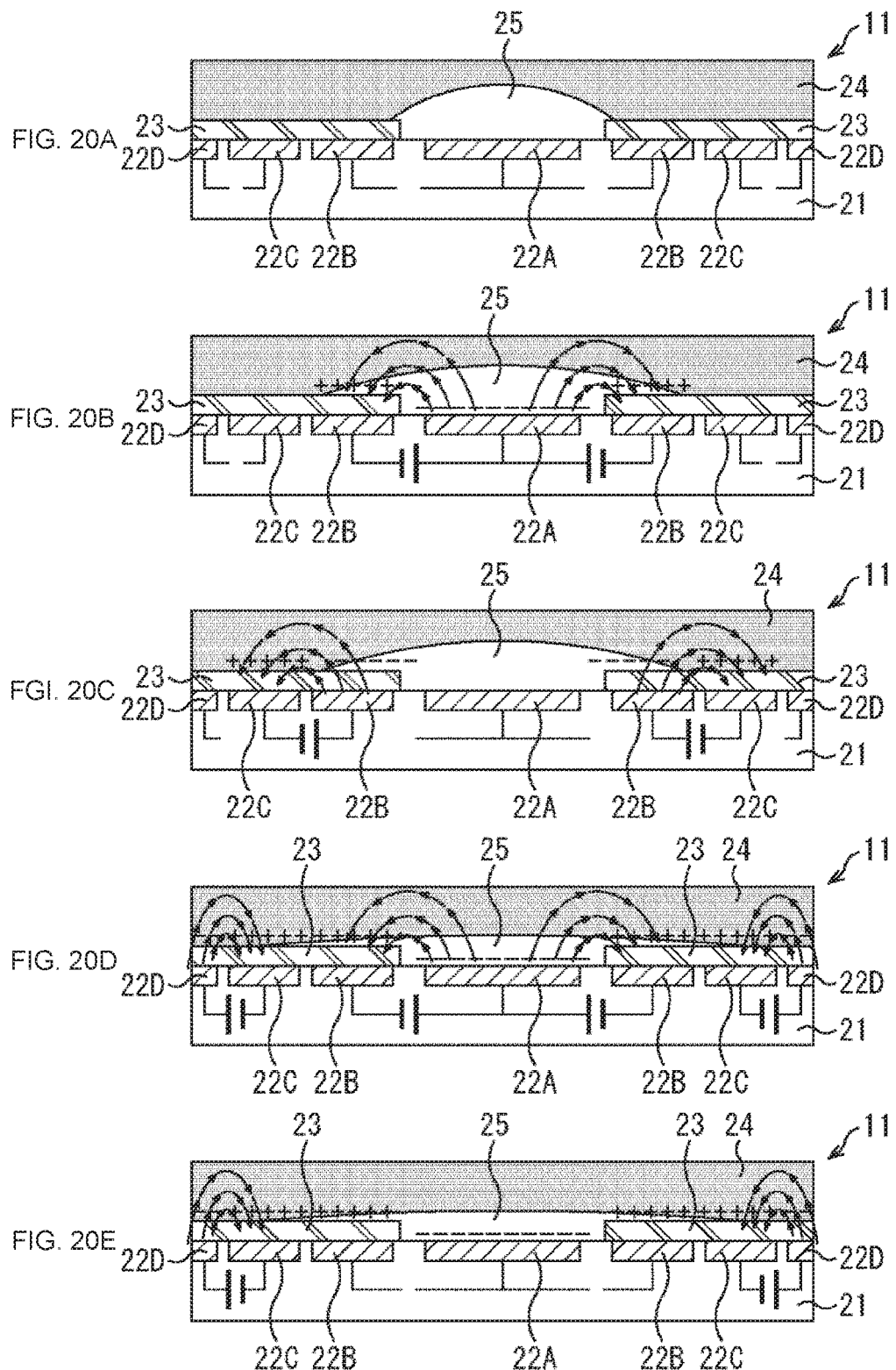

LIQUID LENS, LIQUID LENS DRIVING METHOD, IMAGING APPARATUS, AND DISPLAY APPARATUS

CROSS REFERENCE TO RELATED APPLICATIONS

This application is a U.S. National Phase of International Patent Application No. PCT/JP2017/021273 filed on Jun. 8, 2017, which claims priority benefit of Japanese Patent Application No. JP 2016-123595 filed in the Japan Patent Office on Jun. 22, 2016. Each of the above-referenced applications is hereby incorporated herein by reference in its entirety.

TECHNICAL FIELD

The present technology relates to a liquid lens and a liquid lens driving method, an imaging apparatus, and a display apparatus, and particularly relates to a liquid lens and a liquid lens driving method, an imaging apparatus, and a display apparatus capable of achieving easier manufacture.

BACKGROUND ART

Electrowetting devices utilizing electrowetting phenomenon are known. The electrowetting phenomenon is a phenomenon in which application of voltage between a conductive liquid and an electrode changes the energy of a solid-liquid interface between the electrode surface and the liquid and this changes the shape of the liquid surface.

For example, Patent Document 1 discloses a liquid lens that controls a contact angle between an electrolytic solution and an insulating film so as to controls lens curvature of oil. Since this liquid lens controls the contact angle by only the applied voltage, a high voltage would be required in order to realize the desired lens shape using the electrode on a plane.

To cope with this, there is a device, for example, that utilizes inclination of a side wall surface to control the curvature of the lens at an inherent contact angle so as to lower the applied voltage (refer to Patent Documents 2 and 3, for example).

CITATION LIST

Patent Document

Patent Document 1: Japanese Patent Application Laid-Open No. 2011-150329
Patent Document 2: Japanese Patent Application Laid-Open No. 2013-3210
Patent Document 3: Japanese Patent Application Laid-Open No. 2010-532010

SUMMARY OF THE INVENTION

Problems to be Solved by the Invention

However, the element structures disclosed in Patent Documents 2 and 3 have three-dimensional structures, making it difficult to manufacture.

The present technology has been made in view of such a situation and aims to be able to provide a liquid lens capable of achieving easier manufacture.

Solutions to Problems

A first aspect of the present technology is a liquid lens including a first electrode and a second electrode, to which a predetermined voltage is applied, in which the second electrode is arranged outside the first electrode in a planar direction, and an insulating film having water repellency is formed on an upper surface of the second electrode.

In the first aspect of the present technology, the first electrode and a second electrode, to which a predetermined voltage is applied, are provided, and the second electrode is arranged outside the first electrode in a planar direction, and an insulating film having water repellency is formed on an upper surface of the second electrode.

A second aspect of the present technology is a liquid lens driving method including applying a predetermined voltage to a first electrode and a second electrode of a liquid lens in which the second electrode is arranged outside the first electrode in the planar direction and an insulating film having water repellency is formed on an upper surface of the second electrode.

According to the second aspect of the present technology, the second electrode is arranged outside the first electrode in the planar direction, and a predetermined voltage is applied to the first electrode and the second electrode of the liquid lens, with an insulating film having water repellency being formed on the upper surface of the second electrode.

An imaging apparatus according to a third aspect of the present technology includes a liquid lens that includes a first electrode and a second electrode, to which a predetermined voltage is applied, in which the second electrode is arranged outside the first electrode in a planar direction, with an insulating film having water repellency being formed on an upper surface of the second electrode.

In the third aspect of the present technology, a liquid lens including the first electrode and a second electrode, to which a predetermined voltage is applied, is provided, and the second electrode is arranged outside the first electrode in a planar direction, with an insulating film having water repellency being formed on an upper surface of the second electrode.

A display apparatus according to a fourth aspect of the present technology includes a liquid lens that includes a first electrode and a second electrode, to which a predetermined voltage is applied, in which the second electrode is arranged outside the first electrode in a planar direction, and an insulating film having water repellency is formed on an upper surface of the second electrode.

In the fourth aspect of the present technology, a liquid lens including the first electrode and a second electrode, to which a predetermined voltage is applied, is provided, and the second electrode is arranged outside the first electrode in a planar direction, with an insulating film having water repellency being formed on an upper surface of the second electrode.

Each of the liquid lens, the imaging apparatus, and the display apparatus may be an independent device or a module built into another apparatus.

Effects of the Invention

According to the first to fourth aspects of the present technology, it is possible to further facilitate the manufacture of the liquid lens.

Note that effects described herein are non-restricting. The effects may be any effects described in the present disclosure.

BRIEF DESCRIPTION OF DRAWINGS

FIGS. 2A and 2B are cross-sectional views of a liquid lens according to a first embodiment of the present disclosure.

FIG. 4 is a diagram illustrating a contact angle of oil, produced by voltage application.

FIGS. 13A, 13B, 13C, 13D, and 13E are diagrams illustrating an example of driving a liquid lens according to the second embodiment.

FIG. 15 is a diagram illustrating an example of control of the position and shape of oil in the electrode of FIG. 14A.

FIGS. 18A, 18B, 18C and 18D are diagrams illustrating a modification of the third embodiment.

FIGS. 19A and 19B are cross-sectional views of a liquid lens according to a fourth embodiment of the present disclosure.

FIGS. 20A, 20B, 20C, 20D and 20E are diagrams illustrating an example of driving a liquid lens according to the fourth embodiment.

MODE FOR CARRYING OUT THE INVENTION

Figure 1A:
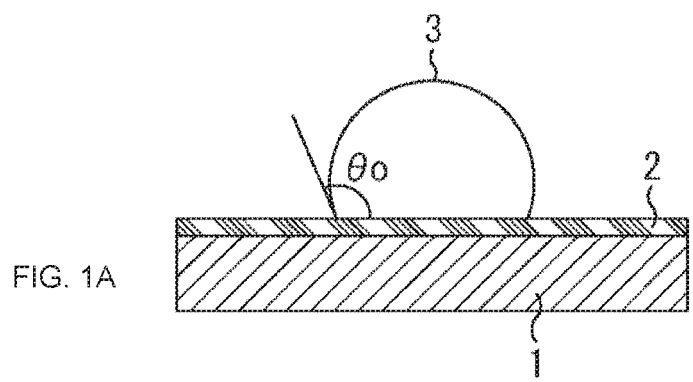
FIGS. 1A and 1B are schematic diagrams illustrating a principle of an electrowetting phenomenon.

Hereinafter, embodiments of the present technology (hereinafter, embodiment(s)) will be described. Note that description will be presented in the following order.

1. Description of electrowetting phenomenon
2. First embodiment of liquid lens
3. Modification of first embodiment
4. Second embodiment of liquid lens
5. Modification of second embodiment
6. Third embodiment of liquid lens
7. Modification of third embodiment
8. Fourth embodiment of liquid lens
9. Summary of liquid lens
10. Application example to imaging apparatus
11. Application example to display apparatus 1. Description of Electrowetting Phenomenon First, an electrowetting phenomenon will be briefly described.

Figure 1B:
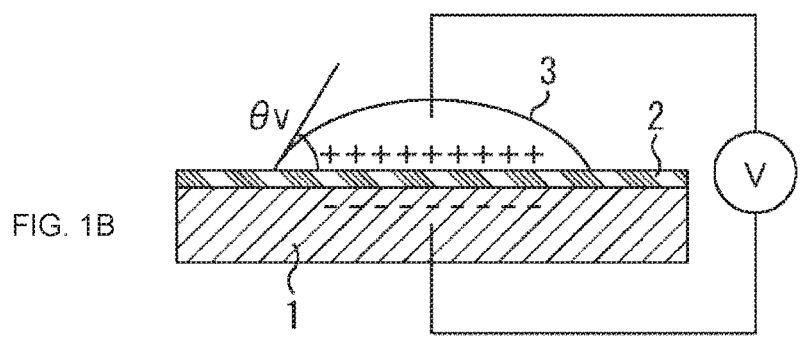

FIGS. 1A and 1B are schematic diagrams illustrating a principle of the electrowetting phenomenon.

As illustrated in FIGS. 1A and 1B, for example, an insulating film 2 is formed on a surface of an electrode 1, and a conductive droplet 3 including an electrolytic solution is disposed on the insulating film 2. The surface of the insulating film 2 undergoes water repellent treatment. As illustrated in FIG. 1A, an interaction energy between the surface of the insulating film 2 and the droplet 3 is low and a contact angle θ0 is large in a no-voltage state in which no voltage is applied. The contact angle θ0 is an angle between the surface of the insulating film 2 and a tangential line of the droplet 3. The contact angle 80 depends on physical properties such as surface tension of the droplet 3 and surface energy of the insulating film 2.

In contrast, as illustrated in FIG. 1B, when a predetermined voltage is applied between the electrode 1 and the droplet 3, electrolytic ions on the droplet 3 side are concentrated on the surface of the insulating film 2, causing a change in the charge amount of a charge double layer, inducing a change in the surface tension of the droplet 3. This phenomenon is the electrowetting phenomenon, and a contact angle θV of the droplet 3 changes in accordance with the magnitude of the applied voltage. That is, in FIG. 1B, the contact angle θV is expressed by Lippman-Young's equation of the following Formula (1) as a function of the applied voltage V.

$$\cos(\theta_v) = \cos(\theta_o) + (\varepsilon_0 \cdot \varepsilon)/(2 \cdot \gamma LG \cdot t) \times V^2 \qquad (1)$$

where,
$\varepsilon_0$: Dielectric constant of vacuum,
$\varepsilon$: Relative dielectric constant of insulating film,
$\gamma LG$: Surface tension of electrolytic solution, and
$t$: Film thickness of insulating film.

As described above, the surface shape (curvature) of the droplet 3 varies in accordance with the magnitude of the voltage V applied between the electrode 1 and the droplet 3. For example, in a case where the droplet 3 is used as a lens element, it is possible to realize an optical element that can electrically control the focal position (focal length).

2. First Embodiment of Liquid Lens

Next, a first embodiment of the liquid lens of the present disclosure will be described.

FIGS. 2A and 2B are cross-sectional views of a liquid lens 11 with the curvature of the lens variable by utilizing the electrowetting phenomenon to control the applied voltage.

FIGS. 2A and 2B illustrate mutually different states of the liquid lens 11 due to the difference in applied voltage.

A first electrode 22A and a second electrode 22B are formed on an upper surface of a support substrate 21. In the cross-sectional views of FIGS. 2A and 2B, the second electrode 22B arranged on both sides of the first electrode 22A. Note that while the example of FIGS. 2A and 2B illustrates a case where the first electrode 22A and the second electrode 22B are embedded in the support substrate 21 such that the uppermost surfaces of the first electrode 22A and the second electrode 22B are flush with uppermost surface of the support substrate 21, it is allowable to form the first electrode 22A and the second electrode 22B on a plane of the support substrate 21.

Figure 3B:
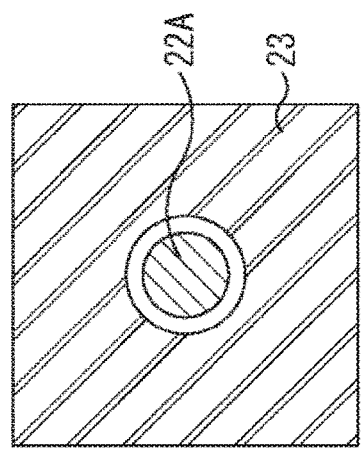
FIGS. 3A and 3B are plan views of an electrode and an insulating film of the liquid lens of FIGS. 2A and 2B.
Figure 3A:
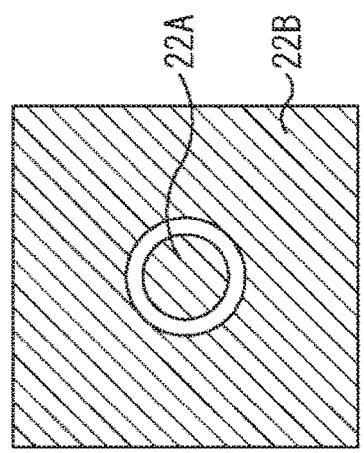

FIG. 3A illustrates planar shapes of the first electrode 22A and the second electrode 22B, in which the first electrode 22A is formed in a circular shape at a center position of the liquid lens 11 in the planar direction. The second electrode 22B is formed outside the first electrode 22A in the planar direction so as to surround the circular first electrode 22A.

The support substrate 21 in FIGS. 2A and 2B are constituted by a member that allows the incident light to pass, such as a glass substrate, for example. The support substrate 21 may also include, for example, an acrylic resin, a polycarbonate resin (PC), an ABS resin, polymethyl methacrylate (PMMA), a polyarylate resin (PAR), a polyethylene terephthalate resin (PET), and the like.

The first electrode 22A and the second electrode 22B may each be formed as a transparent electrode including conductive metal oxides such as an ITO-based material, a silver-doped ITO, an IZO-based material, a SnO2-based material, an In2O3-based material, a SB2O5-based material, a ZnO-based material, an In2O3-ZnO-based material, GA-doped ZnO, In4Sn3O12, and InGAZnO, a metal, an alloy, a semiconductor material, or the like. Furthermore, in a case where there is no need to allow the incident light to pass, it is also allowable to use an opaque metal or alloy as the material of the first electrode 22A and the second electrode 22B. As the opaque metal or alloy, for example, it is possible to use the metal such as aluminum (Al), tungsten (W), niobium (NB), tantalum (TA), molybdenum (Mo), chromium (Cr), copper (Cu), gold (Au), silver (Ag), titanium (Ti), nickel (Ni), cobalt (Co), zirconium (Zr), iron (Fe), platinum (Pt), and zinc (Zn), alloys containing these metal elements (for example, MoW) or a compound (for example, nitride such as TiN, or silicide such as WSi2, MoSi2, TiSi2, or TASi2), a semiconductor such as silicon (Si), a carbon thin film such as diamond, or the like.

An insulating film 23 is formed on the upper surface of the second electrode 22B. Water repellent treatment is applied to the surface of the insulating film 23, and thus, the insulating film 23 has water repellency. As illustrated in FIG. 3B, the planar shape of the insulating film 23 is the same as that of the second electrode 22B.

The material of the insulating film 23 is not particularly limited as long as it is an electrically insulating substance, and preferably, a substance having a relatively high dielectric constant is selected. Furthermore, in order to obtain a relatively large electrostatic capacitance, it is preferable that the thickness of the insulating film 23 be thin. It is necessary, however, that the thickness be the film thickness that can ensure the insulating strength, or more. Examples of materials forming the insulating film 23 include: SiO2 materials such as SiOX material, SiN, SiON, silicon fluoride silicon, polyimide resin, spin on glass (SOG), low melting point glass, glass paste, titanium oxide (TiO2), tantalum oxide (TA2O5), aluminum oxide (Al2O3), magnesium oxide (MgO), chromium oxide (CrOx), zirconium oxide (ZrO2), niobium oxide (NB2O5), tin oxide (SnO2), or vanadium oxide (VOx). Furthermore, for example, the insulating film 23 may include parylene C, parylene N, parylene D, parylene AF-4, parylene F (commercially available as parylene HT or parylene DixF), parylene VT-4, other types of fluorinated parylene, or the like.

In FIGS. 2A and 2B, a first liquid 24 is arranged on the upper surface of the first electrode 22A and the upper surface of the support substrate 21 where the first electrode 22A or the second electrode 22B is not formed. Furthermore, a second liquid 25 is arranged on at least a portion of an upper surface of the insulating film 23 on the second electrode 22B and on the upper surface of the first liquid 24. With this arrangement, the first liquid 24 is in contact with the first electrode 22A, while the second liquid 25 is in contact with the insulating film 23 on the second electrode 22B and with the first liquid 24.

An insulating transparent liquid is used as the first liquid 24, and for example, it is possible to use a non-polar solvent including hydrocarbon type materials such as decane, dodecane, hexadecane or undecane, silicone oil, diphenyl sulfide, methyl naphthalene, diphenylethylene (DPE), Bromonaphthalene, HIVAC, fluorine-based materials, and the like.

A transparent liquid having conductivity is used as the second liquid 25, and examples of these include water, an electrolytic solution (aqueous solution of an electrolyte such as potassium chloride, sodium chloride, and lithium chloride), alcohols such as methyl alcohol having a small molecular weight, ethyl alcohol, ethylene glycol, and propylene glycol, and polar liquids such as ambient temperature molten salt (ionic liquid).

Materials that can exist without being mixed with each other and having mutually different refractive indexes are selected as the first liquid 24 and the second liquid 25. It is preferable that the first liquid 24 and the second liquid 25 have the same specific gravity. Furthermore, the first liquid 24 and the second liquid 25 may be colored as necessary.

The present embodiment will be described on assumption that silicone oil is used as the first liquid 24 and an electrolytic solution is used as the second liquid 25. In the following description, the first liquid 24 will be referred to as oil 24, the second liquid 25 will be referred to as an electrolytic solution 25.

For example, as illustrated in FIG. 4, assuming that the first electrode 22A and the second electrode 22B are arranged to be opposed to each other, a contact angle θon of the oil 24 with voltage application and a contact angle θoff of the oil 24 with no voltage application have a relationship that the contact angle θon is larger than the contact angle θoff (θon >θoff).

Figure 5B:
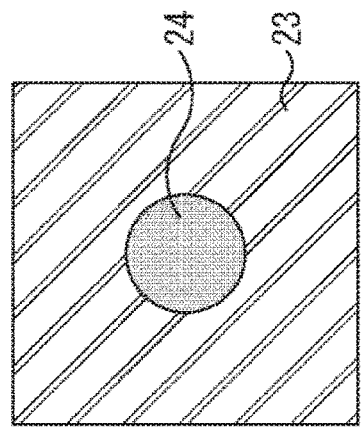
FIGS. 5A and 5B are plan views of the oil of the liquid lens of FIGS. 2A and 2B.
Figure 5A:
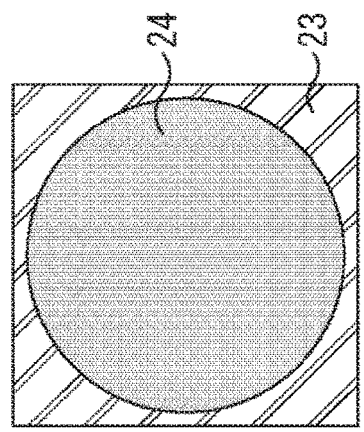

Therefore, in the liquid lens 11 illustrated in FIGS. 2A and 2B in a state where a predetermined voltage is not applied between the first electrode 22A and the second electrode 22B, the contact angle θ of the oil 24 decreases (the contact angle θoff) and the water repellency of the insulating film 23 is utilized so that the surface shape of the oil 24 becomes flat or flat convex shape as illustrated in the cross-sectional view in A of FIG. 2A and the plan view in A of FIG. 5A.

In contrast, in a state where a predetermined voltage is applied between the first electrode 22A and the second electrode 22B so that the first electrode 22A is the positive electrode and the second electrode 22B is the negative electrode, the contact angle θ of the oil 24 is increased (contact angle θon) under the influence of the electric field indicated by the arrows in FIG. 2B. Accordingly, as illustrated in the cross-sectional view in FIG. 2B and the plan view in FIG. 5B, the surface shape of the oil 24 has a convex shape or a spherical shape that is closer to a spherical shape than the shape without voltage application as in FIG. 2A.

In a case where the relationship between the refractive index of the oil 24 and the refractive index of the electrolytic solution 25 is such that the refractive index of the oil 24 is greater than that of the electrolytic solution 25 (oil 24>electrolytic solution 25), the oil 24 would function as a convex lens. In a case where the relationship is such that the refractive index of the electrolytic solution 25 is greater than that of the oil 24 (oil 24<electrolytic solution 25), the electrolytic solution 25 would function as a concave lens.

<Manufacturing method>

Next, a method of manufacturing the liquid lens 11 will be described with reference to FIGS. 6A, 6B, 6C, and 6D.

Figure 6A:
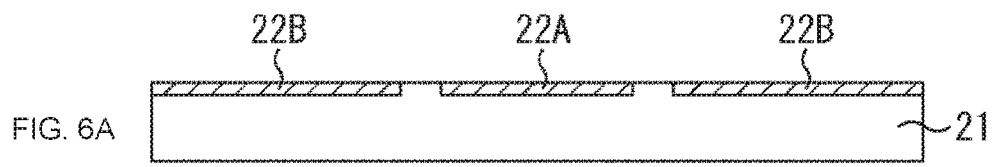
FIGS. 6A, 6B, 6C, and 6D are diagrams illustrating a liquid lens manufacturing method.
Figure 6B:
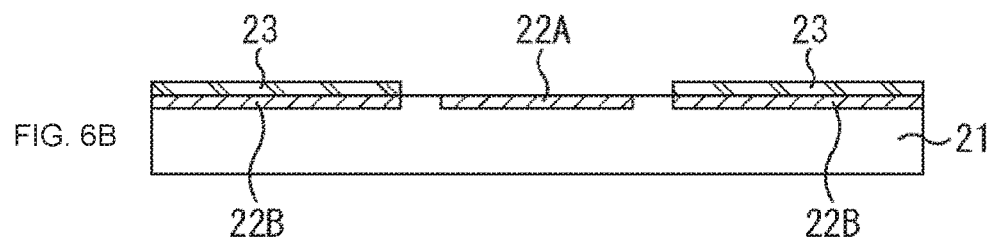

First, as illustrated in FIG. 6A, pattern formation of the first electrode 22A and the second electrode 22B is performed on the upper surface of the support substrate 21 by using lithography technology, and then, the insulating film 23 is formed on the upper surface of the second electrode 22B as illustrated in FIG. 6B. Water repellent treatment of the insulating film 23 is also performed.

Figure 6C:
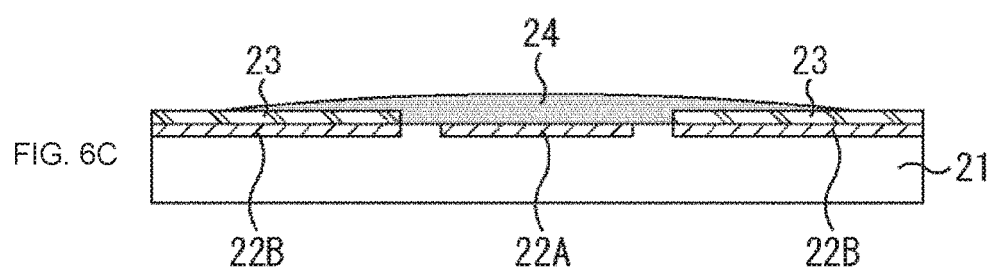
Figure 6D:
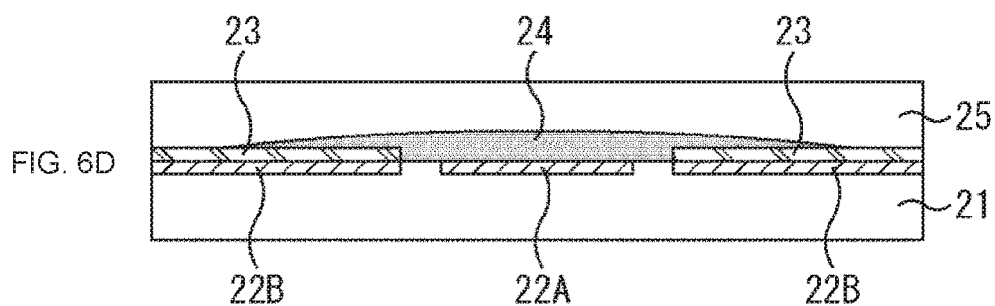

Then, as illustrated in FIG. 6C, the oil 24 is injected into the central portion centered on the first electrode 22A, and thereafter the electrolytic solution 25 is injected as illustrated by FIG. 6D.

Figure 7:
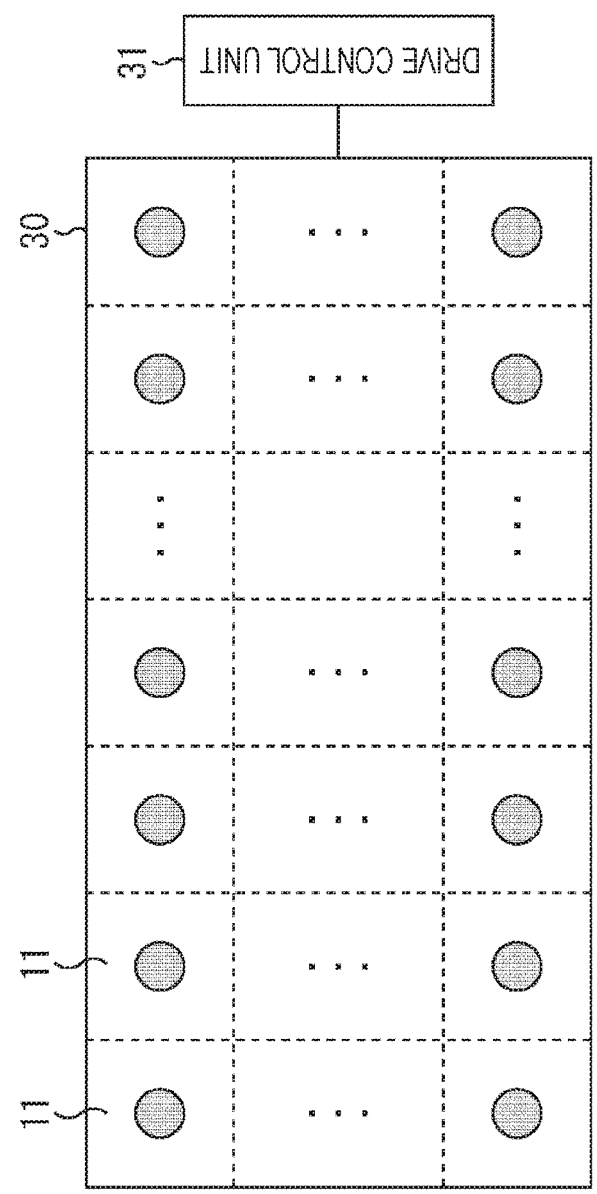
FIG. 7 is a diagram illustrating a lens array.

As illustrated in FIG. 7, a plurality of liquid lenses 11 is arranged in a matrix, making it possible to constitute a lens array 30. The voltage between the first electrode 22A and the second electrode 22B of each of the liquid lenses 11 constituting the lens array 30 is controlled by a drive control unit 31.

In the liquid lens 11 configured as described above, since the first electrode 22A and the second electrode 22B are formed on a same plane instead of positions to opposed to each other, making it possible to be formed simply by lithography technology, leading to easier manufacturing. With facilitated manufacture, it is possible to increase the degree of freedom of design, enhance mass productivity, and drastically reduce the cost. Furthermore, since one electrode layer through which light passes can be formed, the light transmittance can be improved as compared with the case where the first electrode 22A and the second electrode 22B are arranged to be opposed to each other.

3. Modification of First Embodiment

Next, a modification of the first embodiment will be described.

Figure 8A:
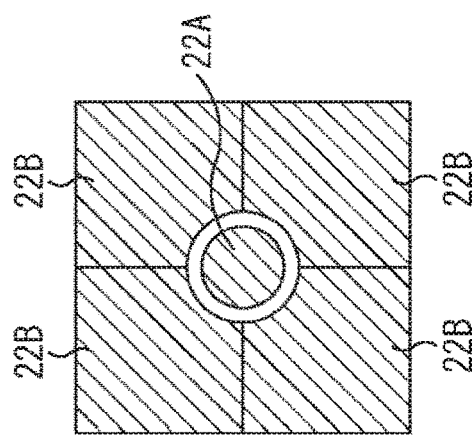
FIGS. 8A, 8B, and 8C are diagrams illustrating a modification of an electrode.
Figure 8B:
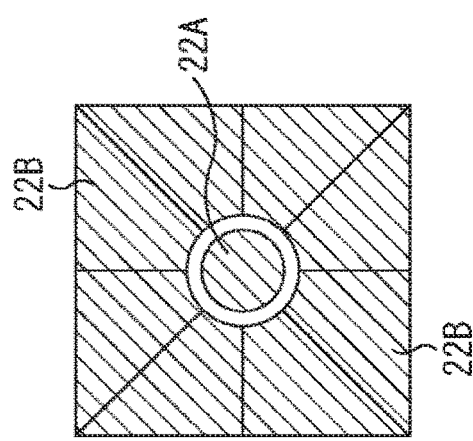

Although the second electrode 22B is constituted by one electrode in the above-described first embodiment, the second electrode 22B may be configured to be divided into a plurality of portions in circumferential direction as illustrated in FIGS. 8A and 8B. In FIG. 8A, the second electrode 22B is divided into four in the circumferential direction. In FIG. 8B, the second electrode 22B is divided into eight in the circumferential direction.

Figure 8C:
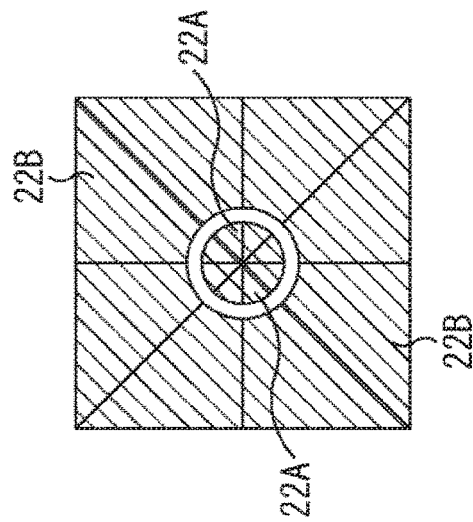

Furthermore, as illustrated in FIG. 8C, the first electrode 22A may also be divided into a plurality of portions in the circumferential direction, in addition to the second electrode 22B.

By applying different voltages to each of the divided regions in the second electrode 22B divided into a plurality of portions in the circumferential direction, it is possible to change the position and shape of the oil 24 as a lens.

Figure 9:
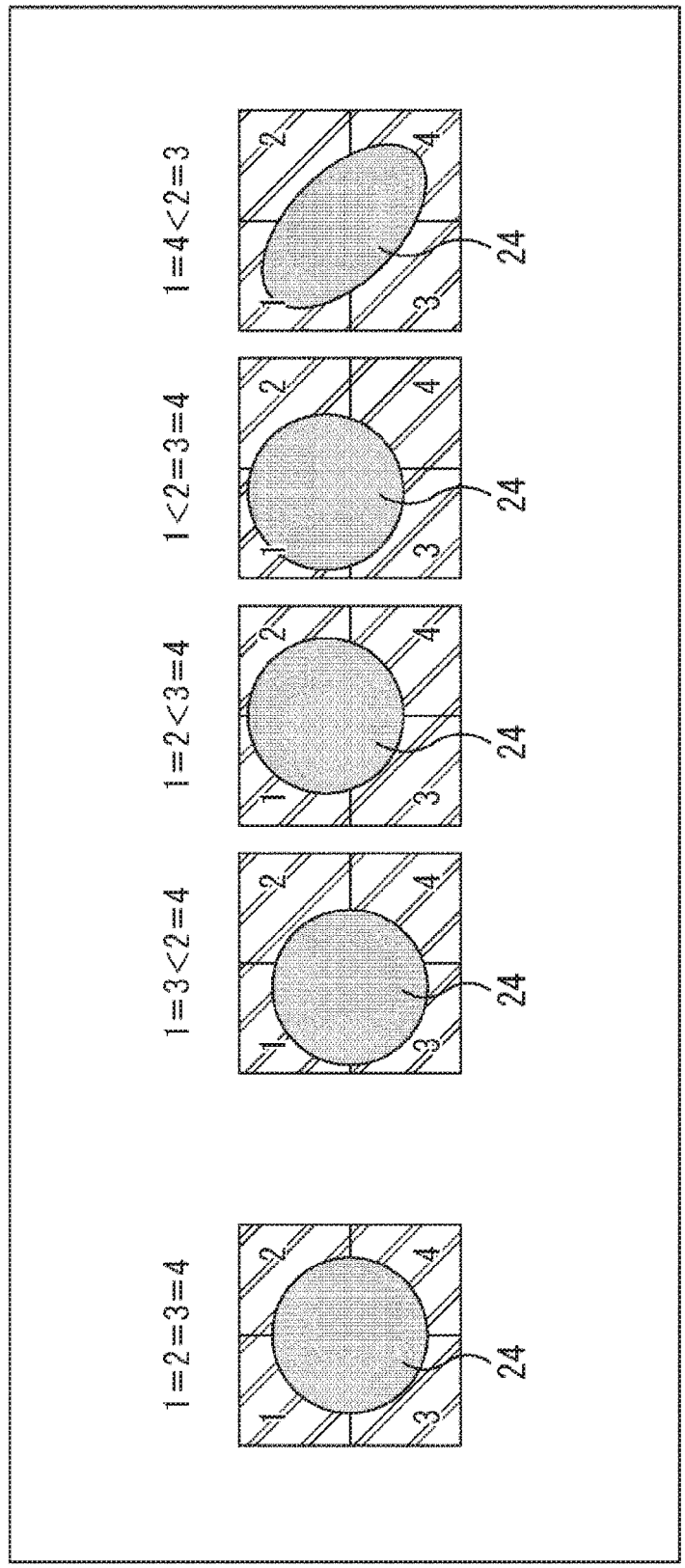
FIG. 9 is a diagram illustrating an example of control of the position and shape of oil in the electrode of FIG. 8A.

FIG. 9 illustrates an example of position and shape of the oil 24 in a case where the second electrode 22B is divided into four regions of first to fourth regions as illustrated in FIG. 8A, and different voltages are applied to the first to fourth regions.

In FIG. 9, the position and shape of the oil 24 in a case where an equal voltage is applied to the first to fourth regions are illustrated in a leftmost figure, and the four figures on the right side illustrate the position and shape of the oil 24 in a case where different voltage is applied to at least one of the first to fourth regions. FIG. 9 illustrates magnitude relationships of voltages applied to the first to fourth regions by using inequality signs and equality signs.

Figure 10:
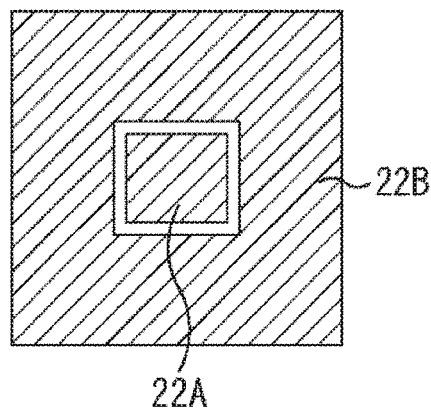
FIG. 10 is a diagram illustrating a modification of an electrode.

Furthermore, the planar shape of the first electrode 22A arranged at the center is formed in a circular shape in the first embodiment described above. However, the planar shape of the first electrode 22A may be a quadrilateral shape as illustrated in FIG. 10, or other polygonal shapes. Regardless of the shape of the first electrode 22A, the second electrode 22B is formed outside the first electrode 22A in the planar direction so as to surround the periphery of the first electrode 22A.

4. Second Embodiment of Liquid Lens

Next, a second embodiment of the liquid lens of the present disclosure will be described. Note that, in the drawings and description of the second embodiment and the subsequent figures, the same reference numerals are given to the corresponding parts of the above-described first embodiment to omit explanation thereof, and description will be given focusing on portions different from the first embodiment.

Figure 11A:
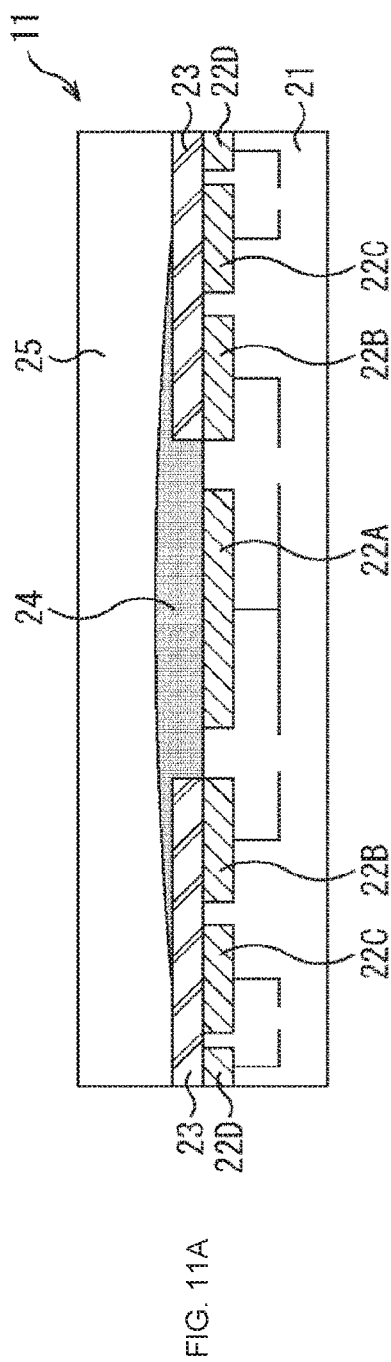
FIGS. 11A and 11B are cross-sectional views of a liquid lens according to a second embodiment of the present disclosure.
Figure 11B:
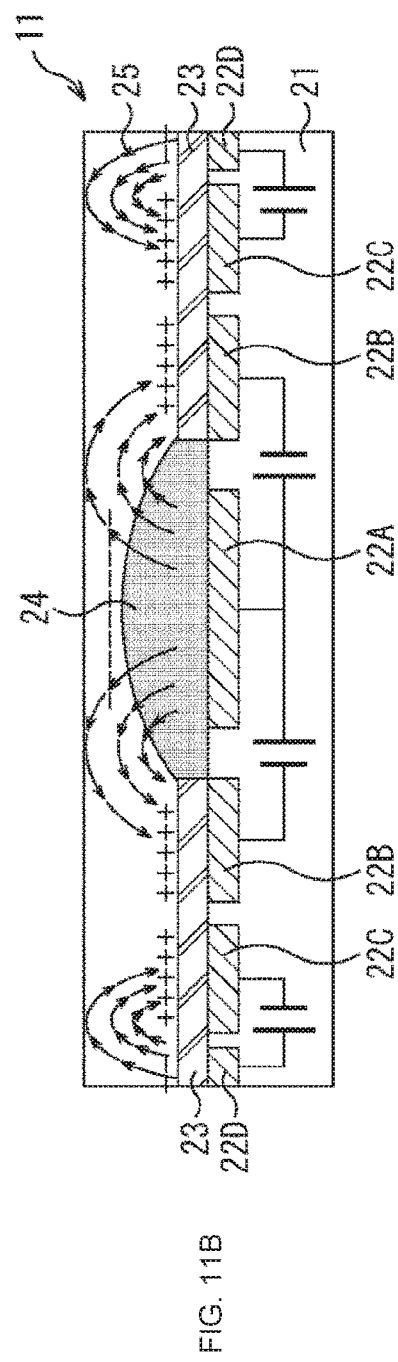

FIGS. 11A and 11B are cross-sectional views of the liquid lens according to the second embodiment.

FIG. 11A illustrates a cross-sectional view of the liquid lens 11 without voltage application, and FIG. 11B illustrates a cross-sectional view of the liquid lens 11 with voltage application.

In the above-described first embodiment, two electrodes 22, namely, the first electrode 22A and the second electrode 22B, are formed on the upper surface of the support substrate 21 as electrodes for applying a voltage. In the second embodiment, four electrodes 22 including a third electrode 22C and a fourth electrode 22D in addition to the first electrode 22A and the second electrode 22B are formed on the upper surface of the support substrate 21.

Figure 12:
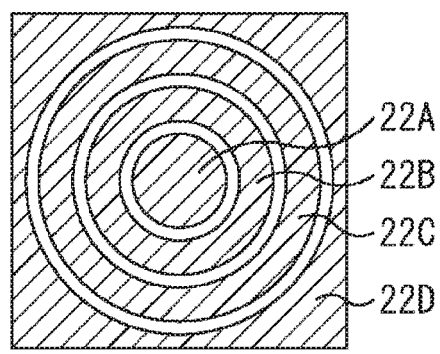
FIG. 12 is a plan view of an electrode of the liquid lens of FIGS. 11A and 11B.

FIG. 12 is a plan view of the first electrode 22A to the fourth electrode 22D viewed from above.

As illustrated in FIG. 12, similarly to the first embodiment, the first electrode 22A is formed in a circular shape at a center position of the liquid lens 11 in the planar direction, and the second electrode 22B to the fourth electrode 22D are concentrically formed outside in the planar direction so as to surround the circular first electrode 22A.

In other words, in the second embodiment, the second electrode 22B in the first embodiment is divided into three in the radial direction, namely, the second electrode 22B to the fourth electrode 22D.

Note that although the example of FIG. 12 is an example in which the planar shape of each of the first electrode 22A to the fourth electrode 22D is a perfect circle, the shape does not need to be a perfect circle, and it may be substantially concentric.

In the liquid lens 11 according to the second embodiment configured as described above, in a case where no voltage is applied to the first electrode 22A to the fourth electrode 22D, the contact angle $\theta$ of the oil 24 decreases (contact angle $\theta$off) and the water repellency of the insulating film 23 is utilized so that the surface shape of the oil 24 becomes a flat or flat convex shape, as illustrated in FIG. 11A.

In contrast, for example, in a case where a predetermined voltage is applied between the first electrode 22A and the second electrode 22B and between the third electrode 22C and the fourth electrode 22D so that the first electrode 22A and the fourth electrode 22D are formed as positive electrodes while the second electrode 22B and the third electrode 22C are formed as negative electrodes as illustrated in FIG. 11B, the contact angle θ of the oil 24 increases (contact angle θon) due to the influence of the electric field indicated by the arrow in FIG. 11B. Accordingly, the surface shape of the oil 24 becomes a convex shape closer to a spherical surface or a spherical shape than the shape without voltage application in FIG. 11A.

The liquid lens 11 of the second embodiment is also configured such that the first electrode 22A and the second electrode 22B are arranged on the same plane, making it easy to manufacture, enhancing the degree of freedom of design and mass productivity, leading to great cost reduction. Furthermore, since it is possible to use one electrode layer through which light passes, enhancing the transmittance of light quantity.

<Driving Method>

The second embodiment enables driving of selection of certain one or two pairs of electrodes 22 when two electrodes 22 are set as a pair among the first to fourth electrodes 22A to 22D arranged in the radial direction, and application of a predetermined voltage to the selected electrodes 22.

FIGS. 13A, 13B, 13C, 13D, and 13E are diagrams illustrating an example of driving of the liquid lens 11 according to the second embodiment performed by the drive control unit 31.

FIG. 13A illustrates a state of the liquid lens 11 without voltage application.

FIG. 13B illustrates a state of the liquid lens 11 when the drive control unit 31 selects the first electrode 22A and the second electrode 22B from among the first electrode 22A to the fourth electrode 22D and applies a predetermined voltage between the first electrode 22A and the second electrode 22B so that the first electrode 22A becomes a positive electrode and the second electrode 22B becomes a negative electrode.

FIG. 13C illustrates a state of the liquid lens 11 when the drive control unit 31 selects the third electrode 22C and the fourth electrode 22D from among the first electrode 22A to the fourth electrode 22D and applies a predetermined voltage between the third electrode 22C and the fourth electrode 22D so that the fourth electrode 22D becomes a positive electrode and the third electrode 22C becomes a negative electrode.

FIG. 13D illustrates a state of the liquid lens 11 when the drive control unit 31 selects the second electrode 22B and the third electrode 22C from among the first electrode 22A to the fourth electrode 22D and applies a predetermined voltage between the second electrode 22B and the third electrode 22C so that the third electrode 22C becomes a positive electrode and the second electrode 22B becomes a negative electrode.

FIG. 13E illustrates a state of the liquid lens 11 when the drive control unit 31 selects all of the first electrode 22A to the fourth electrode 22D and applies a predetermined voltage between the first electrode 22A and the second electrode 22B and between the third electrode 22C and the fourth electrode 22D so that the first electrode 22A and the fourth electrode 22D become positive electrodes and the second electrode 22B and the third electrode 22C become negative electrodes.

The electrolytic solution 25 is influenced by the electric field, whereas the oil 24 is an insulator and thus is not influenced by the electric field. Therefore, for example, a strong electric field would be necessary in a case where the lens state without voltage application in FIG. 13A is directly changed into the lens state in

FIG. 13B.

Therefore, the drive control unit 31 performs stepwise selection of two electrodes 22 to which voltage is to be applied, for example, so as to change the state from the lens state FIG. 13A to the lens state FIG. 13C as a first stage, and then, change the state to the lens state FIG. 13B as a second stage, making it possible to change the lens shape with an electric field of low voltage.

Alternatively, for example, it is possible to change the stage from the lens state FIG. 13A to the lens state FIG. 13C as the first stage and then, change to a lens state FIG. 13D as the second stage so as to perform stepwise change of the lens shape, making it possible to change the curvature of the oil 24 as a convex lens.

Furthermore, for example, it is allowable to change the stage from the lens state FIG. 13A to the lens state FIG. 13C as the first stage and then, change to a lens state FIG. 13E as the second stage so as to perform stepwise change of the lens shape, making it possible to change the curvature of the oil 24 as a convex lens As described above, the drive control unit 31 can perform drive control to selectively apply a predetermined voltage to at least two electrodes 22 from among the first electrode 22A to the fourth electrode 22D. With this configuration, the lens shape of the liquid lens 11 can be controlled with a lower voltage.

5. Modification of Second Embodiment

Next, a modification of the second embodiment will be described.

The first electrode 22A to the fourth electrode 22D may be configured to be divided into a plurality of portions in the circumferential direction similarly to the modification of the first embodiment described with reference to FIGS. 8A, 8B, and 8C.

Figure 14A:
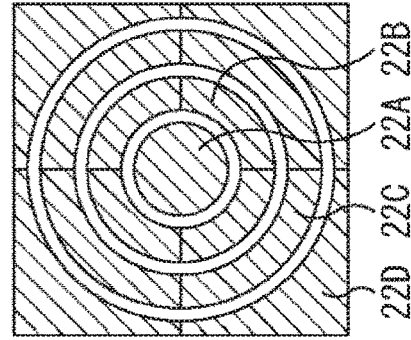
FIGS. 14A, 14B, and 14C are diagrams illustrating a modification of an electrode.

FIG. 14A illustrates a configuration in which the second electrode 22B to the fourth electrode 22D are each divided into four in the circumferential direction.

Figure 14B:
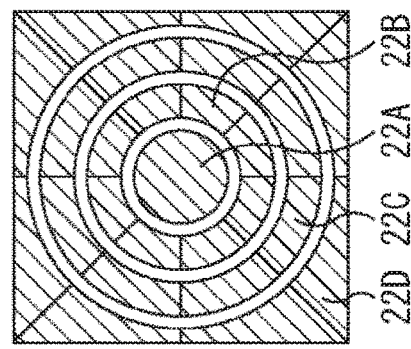
Figure 14C:
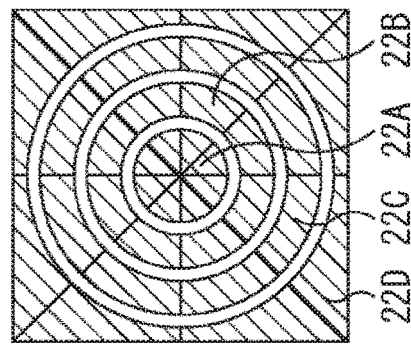

FIG. 14B illustrates a configuration in which the second electrode 22B to the fourth electrode 22D are each divided into eight in the circumferential direction.as FIG. 14C illustrates a configuration in which the first electrode 22A to the fourth electrode 22D are each divided into eight in the circumferential direction.

FIG. 15 illustrates an example of the position and shape of the oil 24 that can be controlled in a case where the configuration illustrated in FIG. 14A is adopted as the first electrode 22A to the fourth electrode 22D.

The position and shape of the oil 24 in the upper part of FIG. 15 are the same as the position and shape of the oil 24 in the modification of the first embodiment illustrated in FIG. 9.

In the modification of the second embodiment, finer control of the position and shape of the oil 24 is possible as illustrated in the lower stage of FIG. 15 in addition to the position and shape of the upper stage oil 24 that can be controlled by the modification of the first embodiment.

6. Third Embodiment of Liquid Lens

Next, a third embodiment of the liquid lens of the present disclosure will be described.

Figure 16A:
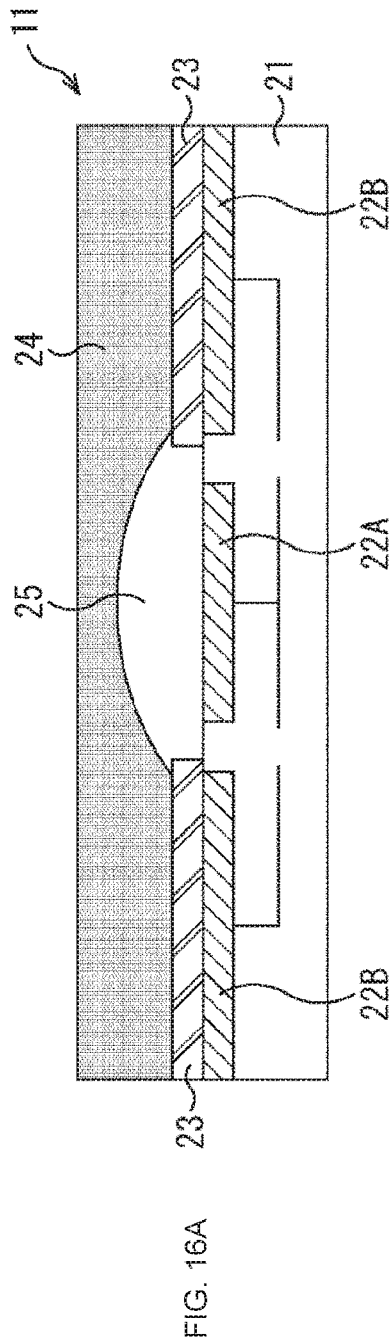
FIGS. 16A and 16B are cross-sectional views of a liquid lens according to a third embodiment of the present disclosure.
Figure 16B:
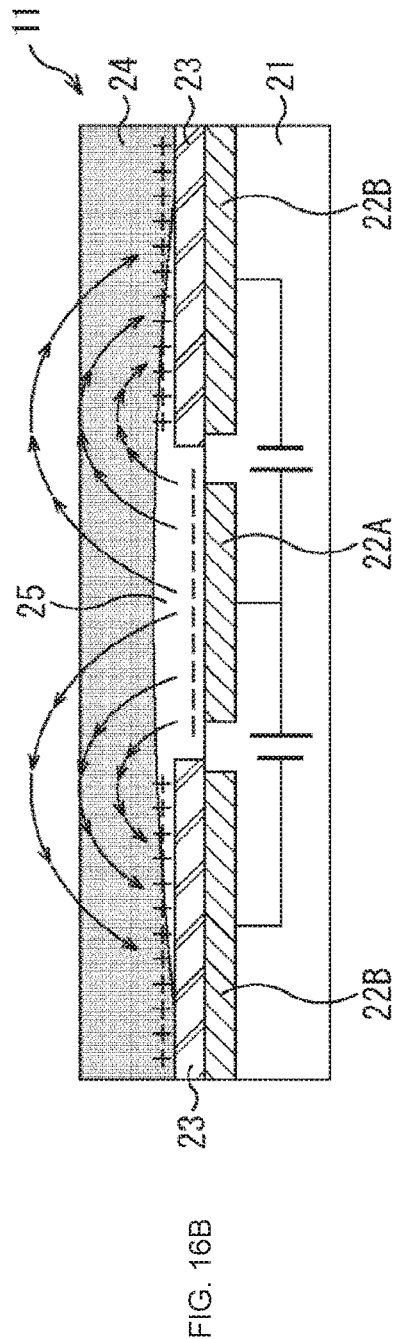

FIGS. 16A and 16B are cross-sectional views of the liquid lens according to the third embodiment.

FIG. 16A illustrates a cross-sectional view of the liquid lens 11 without voltage application, and FIG. 16B illustrates a cross-sectional view of the liquid lens 11 with voltage application.

Compared with the liquid lens 11 of the first embodiment illustrated in FIGS. 2A and 2B, the arrangements of the oil 24 and the electrolytic solution 25 are inverted in the liquid lens 11 of the third embodiment.

Figure 17:
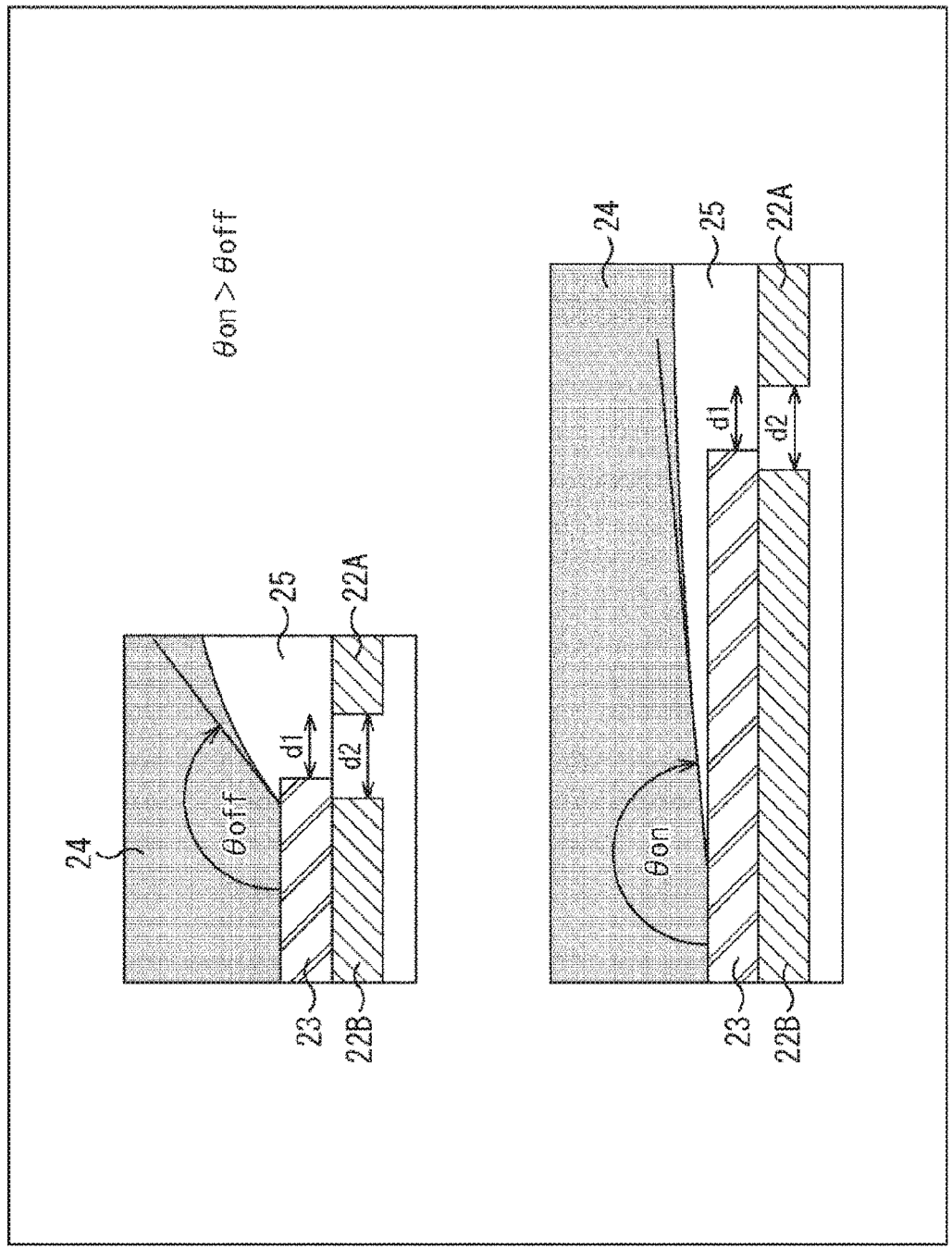
FIG. 17 is a diagram illustrating a contact angle of oil, produced by voltage application.

Furthermore, in the third embodiment, as illustrated in FIG. 17, a distance d1 in the planar direction from the insulating film 23 to the first electrode 22A is shorter than a distance d2 from the second electrode 22B to the first electrode 22A in the planar direction. This is to prevent a short circuit between the first electrode 22A and the second electrode 22B via the electrolytic solution 25.

As illustrated in FIG. 17, a contact angle θon of the oil 24 with voltage application and a contact angle θoff of the oil 24 with no voltage application have a relationship that the contact angle θon is larger than the contact angle θoff (θon >θoff).

Therefore, in the liquid lens 11 illustrated in FIGS. 16A and 16B in a state where a predetermined voltage is not applied between the first electrode 22A and the second electrode 22B, the contact angle θ of the oil 24 decreases (the contact angle θoff) and the water repellency of the insulating film 23 is utilized so that the surface shape of the electrolytic solution 25 becomes a convex shape closer to a spherical surface or a spherical shape, as illustrated in the cross-sectional view in FIG. 16A.

In contrast, in a state where a predetermined voltage is applied between the first electrode 22A and the second electrode 22B so that the first electrode 22A is the positive electrode and the second electrode 22B is the negative electrode, the contact angle θ of the oil 24 is increased (contact angle θon) under the influence of the electric field indicated by the arrows in FIG. 16B. Accordingly, as illustrated in the cross-sectional view in FIG. 16B, the surface shape of the electrolytic solution 25 has a flat or flat convex shape than the shape without voltage application as in FIG. 16A.

In a case where the relationship between the refractive index of the oil 24 and the refractive index of the electrolytic solution 25 is such that the refractive index of the oil 24 is greater than that of the electrolytic solution 25 (oil 24>electrolytic solution 25), the oil 24 would function as a concave lens. In a case where the relationship is such that the refractive index of the electrolytic solution 25 is greater than that of the oil 24 (oil 24<electrolytic solution 25), the electrolytic solution 25 would function as a convex lens. Other configurations of the third embodiment are similar to those of the above-described first embodiment.

The liquid lens 11 of the third embodiment is also configured such that the first electrode 22A and the second electrode 22B are arranged on a same plane, making it easy to manufacture, enhancing the degree of freedom of design and mass productivity, leading to great cost reduction.

Furthermore, since it is possible to use one electrode layer through which light passes, enhancing the transmittance of light quantity.

<7. Modification of third embodiment>

FIGS. 18A, 18B, 18C, and 18D are diagrams illustrating a modification of the third embodiment.

The liquid lens 11 of the third embodiment illustrated in FIGS. 16A and 16B has a configuration as illustrated in FIG. 18A in which the first electrode 22A and the second electrode 22B are formed on the same plane.

Alternatively, however, as illustrated in FIGS. 18B, 18C, and 18D, the first electrode 22A and the second electrode 22B may be arranged such that the plane of the first electrode 22A and the plane of the second electrode 22B have a certain level difference, without being arranged on the same plane. In this case, the first electrode 22A formed at the center portion is formed at a position slightly lower than the second electrode 22B.

In the liquid lens 11 in FIG. 18B, the first electrode 22A is formed at a position slightly lower than the second electrode 22B with a wall surface of the support substrate 21 at an end portion of the first electrode 22A being vertical.

In the liquid lens 11 in FIG. 18C, the first electrode 22A is formed at a position slightly lower than the second electrode 22B with a wall surface of the support substrate 21 at an end portion of the first electrode 22A being inclined (tapered).

In the liquid lens 11 in FIG. 18D, the first electrode 22A is formed at a position slightly lower than the second electrode 22B with a wall surface of the support substrate 21 at an end portion of the first electrode 22A being inclined (tapered) and with formation of a hydrophilic film 41 on the inclined surface and the film surface of the first electrode 22A. This hydrophilic film 41 may also be formed on the upper surface of the support substrate 21 and the upper surface of the first electrode 22A on which the insulating film 23 is not formed even in the configuration in FIG. 18A or FIG. 18B.

Even in the case where a certain level difference is provided between the plane of the first electrode 22A and the plane of the second electrode 22B in this manner, it is possible to achieve easier manufacture compared with the case of arranging the two electrodes to be opposed to each other, enhancing the degree of freedom of design and mass productivity, leading to great cost reduction. Furthermore, since it is possible to use one electrode layer through which light passes, enhancing the transmittance of light quantity.

Note that it is possible to use a configuration having a level difference between the plane of the first electrode 22A and the planes of the surrounding second electrode 22B to the fourth electrode 22D as in FIGS. 18B, 18C, and 18D also in the first and second embodiments and the fourth embodiment described later as well. In the first and second embodiments, the film corresponding to the hydrophilic film 41 in FIG. 18D would be a lipophilic film.

Furthermore, in the third embodiment, it is also possible to adopt a configuration of the first electrode 22A and the second electrode 22B being each divided into a plurality of portions in the circumferential direction as illustrated in FIGS. 8A, 8B, and 8C, or having substantially concentric quadrilateral shapes illustrated in FIG. 10.

8. Fourth Embodiment of Liquid Lens

Next, a fourth embodiment of the liquid lens of the present disclosure will be described.

FIGS. 19A and 19B are cross-sectional views of a liquid lens according to the fourth embodiment.

FIG. 19A illustrates a cross-sectional view of the liquid lens 11 without voltage application, and FIG. 19B illustrates a cross-sectional view of the liquid lens 11 with voltage application.

Compared with the liquid lens 11 of the second embodiment illustrated in FIGS. 11A and 11 B, the arrangements of the oil 24 and the electrolytic solution 25 are inverted in the liquid lens 11 of the fourth embodiment. Other configurations of the fourth embodiment are similar to those of the second embodiment. That is, the first electrode 22A to the fourth electrode 22D are concentrically formed as the circular first electrode 22A as a center.

In a case where no voltage is applied to the first electrode 22A to the fourth electrode 22D, the contact angle θ of the oil 24 decreases (contact angle θoff) and the water repellency of the insulating film 23 is utilized, so that the surface shape of the electrolytic solution 25 has a convex shape closer to a spherical surface or a spherical shape as illustrated in FIG. 19A.

In contrast, for example, in a case where a predetermined voltage is applied between the first electrode 22A and the second electrode 22B and between the third electrode 22C and the fourth electrode 22D so that the first electrode 22A and the fourth electrode 22D are formed as positive electrodes while the second electrode 22B and the third electrode 22C are formed as negative electrodes as illustrated in FIG. 19B, the contact angle θ of the oil 24 increases (contact angle θon) due to the influence of the electric field indicated by the arrow in FIG. 19B. Accordingly, the surface shape of the electrolytic solution 25 becomes flat or flat convex shape than the shape without voltage application in FIG. 19A.

The liquid lens 11 of the fourth embodiment is also configured such that the first electrode 22A and the second electrode 22B are arranged on the same plane, making it easy to manufacture, enhancing the degree of freedom of design and mass productivity, leading to great cost reduction. Furthermore, since it is possible to use one electrode layer through which light passes, enhancing the transmittance of light quantity.

<Driving Method>

The fourth embodiment also enables driving of selection of certain one or two pairs of electrodes 22 when two electrodes 22 are set as a pair among the first to fourth electrodes 22A to 22D arranged in the radial direction, and application of a predetermined voltage to the selected electrodes 22.

FIGS. 20A, 20B, 20C, 20D, and 20E are diagrams illustrating an example of driving of the liquid lens 11 according to the fourth embodiment performed by the drive control unit 31.

FIG. 20A illustrates a state of the liquid lens 11 without voltage application.

FIG. 20B illustrates a state of the liquid lens 11 when the drive control unit 31 selects the first electrode 22A and the second electrode 22B from among the first electrode 22A to the fourth electrode 22D and applies a predetermined voltage between the first electrode 22A and the second electrode 22B so that the first electrode 22A becomes a positive electrode and the second electrode 22B becomes a negative electrode.

FIG. 20C illustrates a state of the liquid lens 11 when the drive control unit 31 selects the second electrode 22B and the third electrode 22C from among the first electrode 22A to the fourth electrode 22D and applies a predetermined voltage between the second electrode 22B and the third electrode 22C so that the second electrode 22B becomes a positive electrode and the third electrode 22C becomes a negative electrode.

FIG. 20D illustrates a state of the liquid lens 11 when the drive control unit 31 selects all of the first electrode 22A to the fourth electrode 22D and applies a predetermined voltage between the first electrode 22A and the second electrode 22B and between the third electrode 22C and the fourth electrode 22D so that the first electrode 22A and the fourth electrode 22D become positive electrodes and the second electrode 22B and the third electrode 22C become negative electrodes.

FIG. 20E illustrates a state of the liquid lens 11 when the drive control unit 31 selects the third electrode 22C and the fourth electrode 22D from among the first electrode 22A to the fourth electrode 22D and applies a predetermined voltage between the third electrode 22C and the fourth electrode 22D so that the fourth electrode 22D becomes a positive electrode and the third electrode 22C becomes a negative electrode.

In a case where the lens shape is changed from the shape of the lens of FIG. 20A where the surface shape of the electrolytic solution 25 is close to a spherical surface to a lens shape in which the surface shape of the electrolytic solution 25 is nearly flat, the drive control unit 31 performs stepwise control of applied voltage in the order of FIG. 20B, FIG. 20C, and FIG. 20D, for example. Alternatively, the drive control unit 31 performs stepwise control of applied voltage in the order of FIG. 20B, FIG. 20C, FIG. 20E, for example. This makes it possible to change the lens shape with an electric field of a low voltage.

As described above, the drive control unit 31 can perform drive control to selectively apply a predetermined voltage to at least two electrodes 22 from among the first electrode 22A to the fourth electrode 22D. With this configuration, the lens shape of the liquid lens 11 can be controlled with a lower voltage.

9. Summary of Liquid Lens

As described above, the liquid lens 11 has a configuration of having the plurality of electrodes 22 (the first electrode 22A and the second electrode 22B, or the first electrode 22A to the fourth electrode 22D) undergoing application of a predetermined voltage being arranged on substantially the same plane so as to be adjacent to each other in the radial direction. With this configuration, it is possible to achieve easier manufacture of the liquid lens 11, enhancement of the degree of freedom of design and mass productivity, and great cost reduction. Furthermore, since it is possible to use one electrode layer through which light passes, enhancing the transmittance of light quantity.

Moreover, the curvature of the lens shape of the liquid lens 11 can be changed by controlling (turning on and off) the voltage applied to the plurality of electrodes 22 in the radial direction, enabling changing the refractive power of the lens.

Furthermore, the plurality of electrodes 22 (the second electrode 22B to the fourth electrode 22D) are arranged on the outside (radial direction), in the planar direction, of the first electrode 22A arranged in the center, and selective application of a predetermined voltage is performed onto two adjacent electrodes 22, enabling control of the lens shape of the liquid lens 11 with a lower voltage.

Note that the above-described embodiment is an example in which three electrodes 22 (the second electrode 22B to the fourth electrode 22D) are arranged on the outside (radial direction) of the first electrode 22A arranged in the center in the planar direction, and it would be sufficient that the number of the electrodes 22 arranged outside the first electrode 22A may be two or more.

Furthermore, it is possible to change the position and shape of the oil 24 or the electrolytic solution 25 as a lens by dividing at least one of the plurality of electrodes 22 arranged in radial direction adjacent to each other on substantially the same plane into a plurality of portions in the circumferential direction and applying different voltages to these portions.

10. Application Example to Imaging Apparatus

The liquid lens 11 described above can be incorporated, for example, as a component constituting the imaging apparatus. Hereinafter, an example of an imaging apparatus using the liquid lens 11 will be described.

<Application Example to Multi-Layer Lens>

Figure 21:
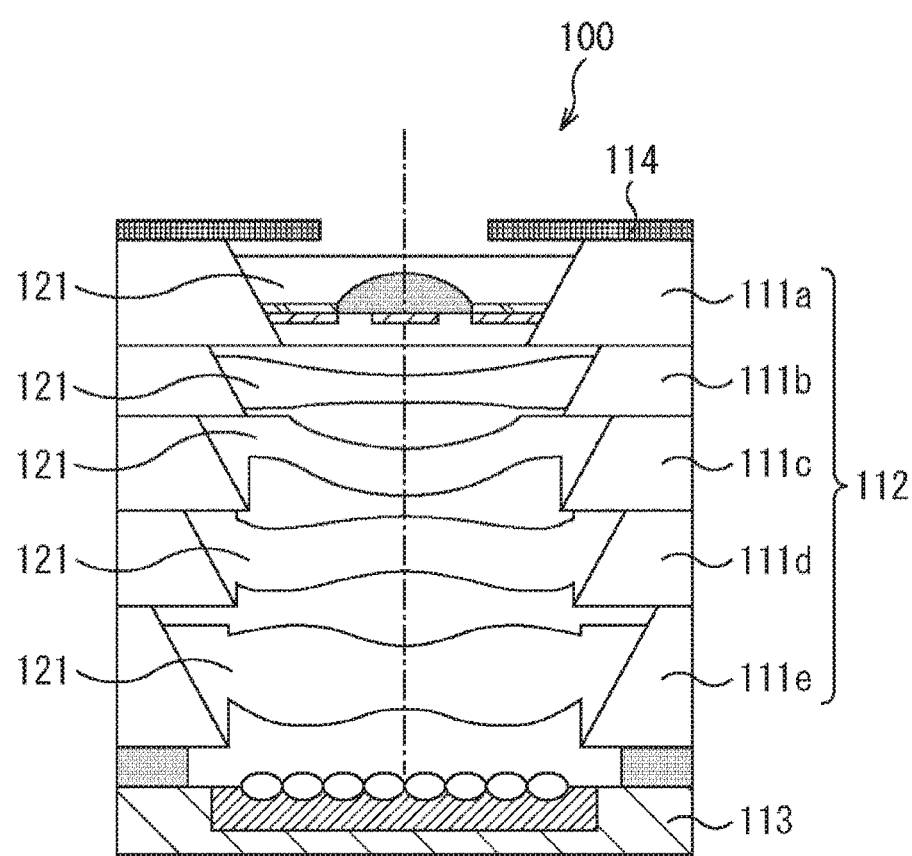
FIG. 21 is a diagram illustrating an application example to a multi-layer lens.

FIG. 21 is a diagram illustrating an example in which the liquid lens 11 is applied to a multi-layer lens.

The imaging apparatus 100 in FIG. 21 includes a multi-layer lens structure 112 in which a plurality of lens-attached substrates 111 is stacked, and a light receiving element 113.

In the imaging apparatus 100, the light incident on the multi-layer lens structure 112 from above is transmitted through the multi-layer lens structure 112 and is received by the light receiving element 113 arranged on the lower side of the multi-layer lens structure 112. The light receiving element 113 is, for example, a front-illuminated or back-illuminated complementary metal oxide semiconductor (CMOS) image sensor. On the multi-layer lens structure 112, a diaphragm plate 114 is disposed. The diaphragm plate 114 includes a layer including a material having light absorbing property or light shielding property, for example.

In the example of FIG. 21, the multi-layer lens structure 112 is constituted with five lens-attached substrates 111a to 111e, and each of the five lens-attached substrates 111a to 111e includes a lens 121. Specifically, at least one of the lenses 121 of the lens-attached substrates 111a to 111e is formed with the liquid lens 11 described above. In the example of FIG. 21, the lens 121 of the lens-attached substrate 111a is the liquid lens 11.

As illustrated in the example of FIG. 21, in a case where the lens 121 of one lens-attached substrate 111 among the plurality of lens-attached substrates 111 is the liquid lens 11, the liquid lens 11 functions as a variable focus lens, providing the multi-layer lens structure 112 with an autofocus function.

Furthermore, for example, in a case where the lenses 121 of a plurality of the lens-attached substrates 111 among the plurality of lens-attached substrates 111 are the liquid lenses 11, the liquid lens 11 functions as a variable focus lens, providing the multi-layer lens structure 112 with a zoom function.

<Application Example to Microlens Array>

Figure 22:
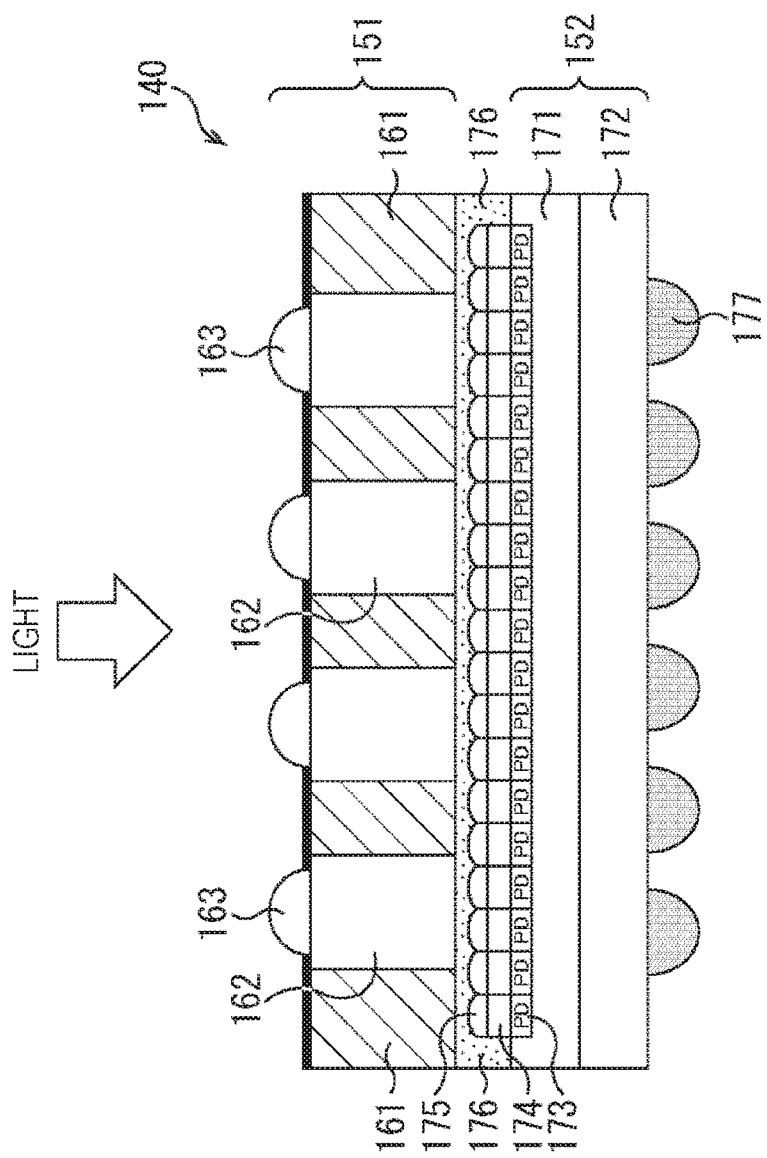
FIG. 22 is a diagram illustrating an application example to a microlens array.

FIG. 22 is a diagram illustrating an example in which the liquid lens 11 is applied to a microlens array.

The imaging apparatus 140 in FIG. 22 includes a microlens array substrate 151 and a multi-layer light receiving element 152.

The microlens array substrate 151 includes a plurality of light guides 162 and microlens 163 each formed on an upper surface (light incident side) of each of the light guides 162, in a carrier substrate 161 including a silicon substrate or the like.

The multi-layer light receiving element 152 is formed by stacking an upper substrate 171 and a lower substrate 172. On the upper substrate 171, a photodiode (PD) 173, a color filter 174, and an on-chip lens 175 are formed in an array, and an outermost surface is covered with a sealing resin 176. On the lower substrate 172, a signal processing circuit for processing pixel signals generated by the photodiodes 173 and external terminals 177 constituted with solder balls or the like are formed.

In the microlens array substrate 151, incident light is collected in units of the plurality of microlenses 163 arranged in the carrier substrate 161, so as to be focused by the photodiode 173 on the upper substrate 171. The microlens 163 on the microlens array substrate 151 is configured with the liquid lens 11 described above.

In a case where the imaging apparatus 140 controls the lens shape of each of the plurality of microlenses 163 adopting the liquid lens 11 so as to have mutually different focal positions, it is possible to generate a plurality of images having mutually different focal positions in units of the light guides 162.

In another case where the imaging apparatus 140 controls the lens shape of each of the plurality of microlenses 163 adopting the liquid lens 11 so as to have the same focal position, it is possible to generate a plurality of images having parallax.

<Application Example to Light Field Camera>

Figure 23:
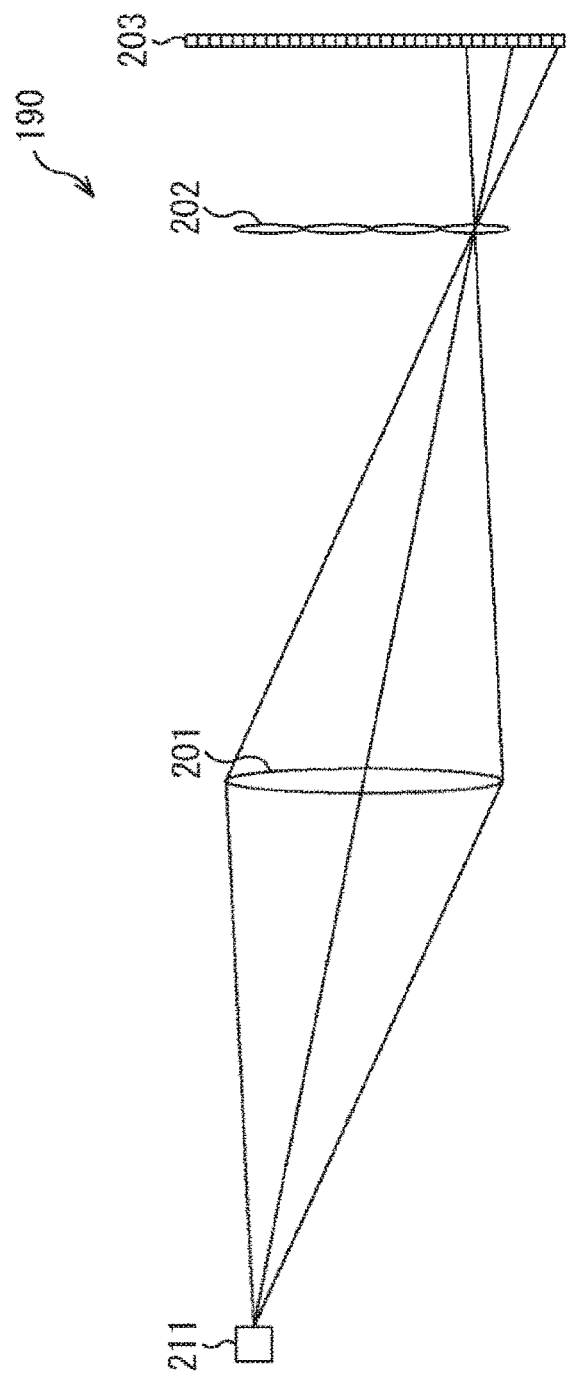
FIG. 23 is a diagram illustrating an application example to a light field camera.

FIG. 23 is a diagram illustrating an example in which the liquid lens 11 is applied to a light field camera (imaging apparatus).

An imaging apparatus 190 in FIG. 23 includes a main lens 201, a microlens array 202, and an image sensor 203 that receives light from a subject 211 and photoelectrically converts the received light. The microlens array 202 is provided at the focal position of the main lens 201, and the image sensor 203 is provided at the focal position of the microlens array 202. Each of the microlenses of the microlens array 202 is provided for each of a plurality of pixels of the image sensor 203.

In the imaging apparatus 190 configured as described above, each of the microlenses included in the microlens array 202 is constituted with the liquid lens 11.

In a case where the lens shape of the liquid lens 11 as the microlens of the microlens array 202 is controlled to a convex shape, the imaging apparatus 190 can be used as a light field camera.

In another case where the lens shape of the liquid lens 11 as the microlens of the microlens array 202 is controlled to have a flat shape, the imaging apparatus 190 can be used as a normal camera that images the light from the subject 211 on the image sensor 203.

As described above, the liquid lens 11 can be used as a component of various imaging apparatuses.

11. Application Example to Display Apparatus

The above-described liquid lens 11 can be incorporated as a component of a display apparatus. In the following, an example of a display apparatus using the liquid lens 11 will be described.

Figure 24:
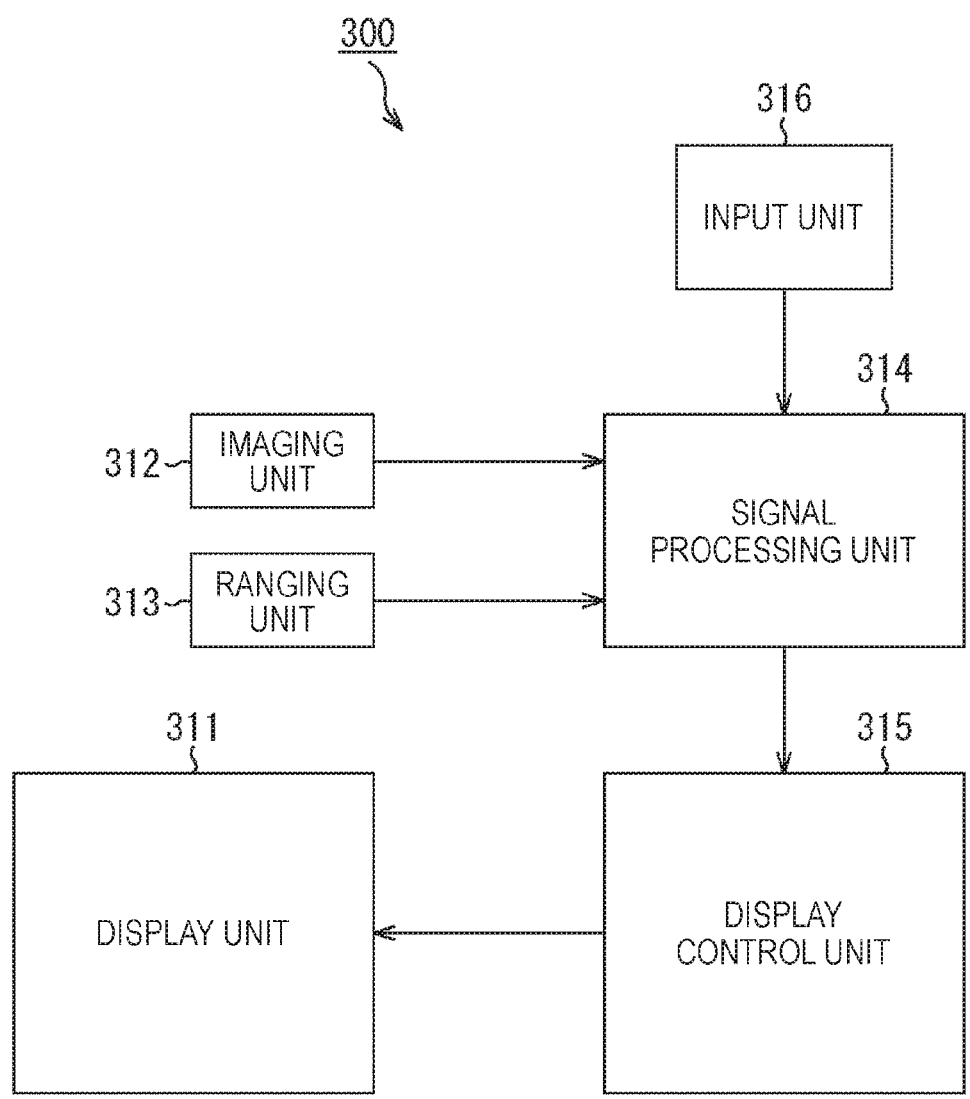
FIG. 24 is a block diagram illustrating a configuration example of a display apparatus using the liquid lens of the present disclosure.

FIG. 24 is a block diagram illustrating an exemplary configuration of a display apparatus according to the present disclosure.

A display apparatus 300 includes a display unit 311, an imaging unit 312, a ranging unit 313, a signal processing unit 314, a display control unit 315, and an input unit 316.

The signal processing unit 314 and the display control unit 315 may be formed with a microcomputer, for example.

The display apparatus 300 is a virtual image display apparatus capable of presenting a virtual image at a presentation position different from a display surface of the display unit 311 and also a display apparatus capable of a real image (two-dimensional image) on the display surface of the display unit 311. For example, the display apparatus 300 presents a virtual image with an aspect ratio different from the aspect ratio of the display surface of the display unit 311.

Figure 25:
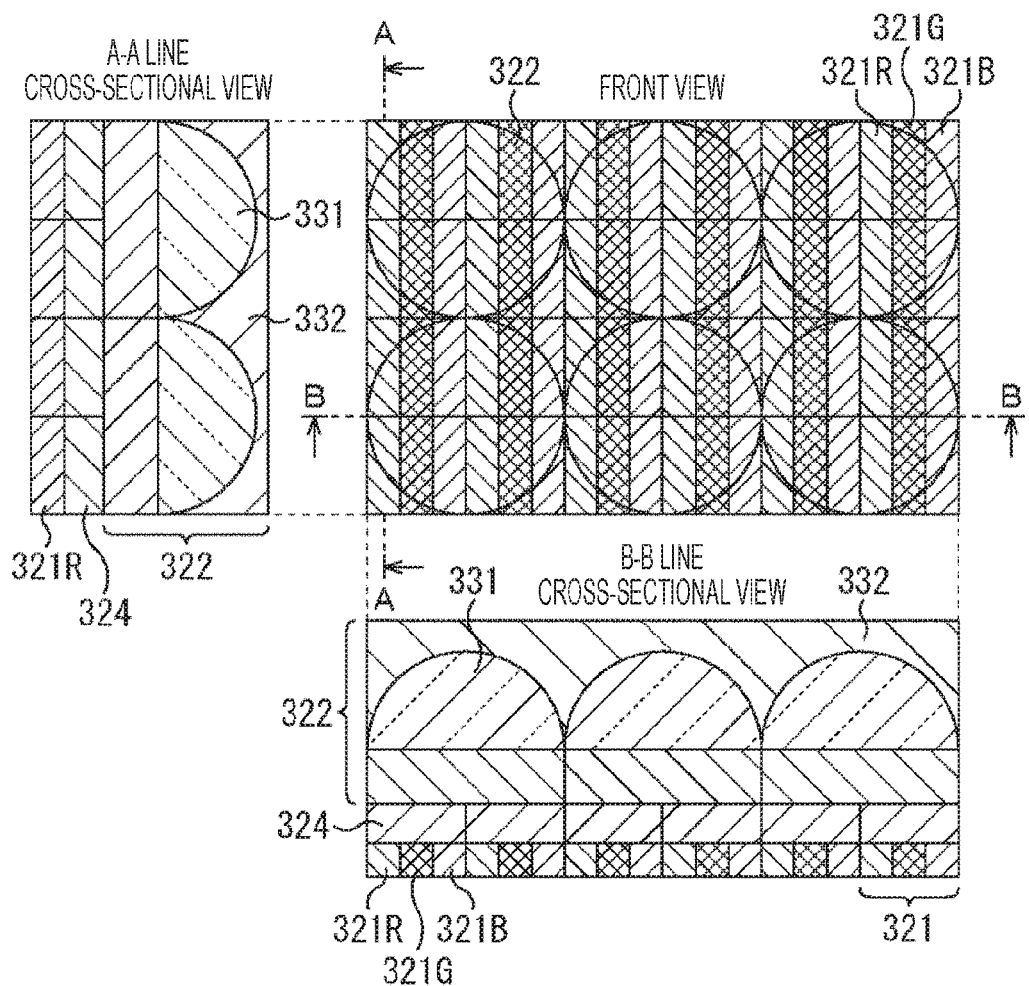
FIG. 25 is a diagram illustrating a configuration example of a display unit of a display apparatus.

FIG. 25 illustrates a configuration example of the display unit 311.

The display unit 311 includes an organic EL display apparatus using an organic electro luminescence (EL) element, as a light emitting unit, for example. Note that the display unit 311 is not limited to the organic EL display apparatus. Alternatively, it is possible to use, as the display unit 311, other flat surface type (flat panel type) display apparatuses such as a liquid display apparatus, a field emission display (FED) display apparatus.

On the display unit 311, a single pixel (pixel) 321 as a unit of forming a color image is formed with three sub pixels (subpixels), for example. For example, the single pixel 321 is formed with sub pixels with three primary colors, namely, a red pixel 321R including an organic EL element that emits red (R) light, a green pixel 321G including an organic EL element that emits green (G) light, a blue pixel 321B including an organic EL element that emits blue (B) light.

Note that formation of the single pixel 321 is not limited to a combination of the sub pixels of the three primary colors of RGB, and it is possible to form one pixel by adding another sub pixel of another color or a plurality of colors, to the sub pixel formed with the three primary colors. More specifically, it is possible, for example, to form one pixel by adding a sub pixel that emits white (W) light in order to enhance luminance, or form one pixel by adding at least one sub pixel that emits complementary color light in order to expand color reproduction range.

As illustrated in FIG. 25, the display unit 311 has a configuration in which, for example, microlenses 322 are arranged in an array with a plurality of pixels 321, preferably even pixels, as a unit.

FIG. 25 illustrates a front view of a microlens array of 2×3, for example, a cross-sectional view taken along a A-A line in the front view (A-A line cross-sectional view), and a cross-sectional view taken along a B-B line in the front view (B-B line cross-sectional view).

In FIG. 25, one microlens 322 is arranged for 2×2 (=four) pixels 321 via a diffusion layer 324 over subpixels 321R, 321G, and 321B.

Figure 26:
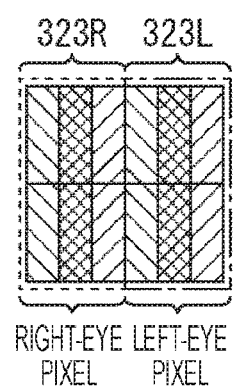
FIG. 26 is a diagram illustrating a configuration example of a display unit of a display apparatus.

For example, as illustrated in FIG. 26, the four pixels 321 as a unit in which one microlens 322 is arranged include: two right-eye pixels 323R on the left side in a pair of upper and lower pixels; and two left-eye pixels 323L on the right side in a pair of upper and lower pixels.

The microlens 322 is the liquid lens 11 of the present disclosure and includes a first liquid 331 and a second liquid 332. One of the first liquid 331 and the second liquid 332 is a transparent liquid having insulating properties such as oil and the other is a transparent liquid having conductivity such as an electrolytic solution.

With such a configuration, the microlens 322 functions as a variable focus lens capable of varying the focal length, making it possible to adjust the presentation position of the virtual image by changing the focal length under the drive control by the display control unit 315. Moreover, by not providing the microlens 322 with a lens function, it is possible to display a real image (two-dimensional image) on the display surface of the display unit 311.

The microlens 322 acts so as to adjust a presentation position of a virtual image by the focal length, such that a focus position of the eye lens of the observer, that is, the presentation position of the virtual image comes at a position different from the position on the display surface of the display unit 311 (that is, a position either more distant or less distant than the display surface). In other words, the microlens 322 acts so as to focus light of the image from a plurality of corresponding pixels, onto the retina of the eye of the observer and to allow the observer to visually recognize the focused image as a virtual image.

The imaging unit 312 and the ranging unit 313 are attached integrally with the display unit 311 and constitute a portion of a detection unit configured to detect positional information and orientation information on the eye of the observer with respect to the display surface of the display unit 311. The imaging unit 312 is formed with a camera that can photograph the face of the observer who observes the display image of the display unit 311, and supplies the captured image information to the signal processing unit 314.

The ranging unit 313 measures a distance between the display surface of the display unit 311 and the eye of the observer and outputs a result as distance information on the distance from the display surface of the display unit 311 to the eye of the observer. An exemplary applicable ranging unit 313 would be a unit configured to measure the distance between the display surface of the display unit 311 and the eye of the observer using a time-of-flight (TOF) method using infrared light or the like, for example. Alternatively, it is possible use a configuration having another camera in addition to the camera constituting the imaging unit 312 and measuring the distance between the display surface of the display unit 311 and the eye of the observer using a triangulation method by the images captured by the two cameras.

The signal processing unit 314 processes the image information captured by the imaging unit 312 and the distance information measured by the ranging unit 313, as input. Subsequently, the signal processing unit 314 detects positional information and orientation information of the eye of the observer with respect to the display surface of the display unit 311 on the basis of the image information captured by the imaging unit 312 and the distance information measured by the ranging unit 313. The positional information on the eye of the observer includes the distance between the display surface of the display unit 311 and the eye of the observer, the interval between the left eye and the right eye (interocular), and the like. The orientation information on the eye of the observer includes inclination of the eye with respect to the display unit 311, that is, inclination of the line connecting the left eye and the right eye, with respect to the display unit 311, or the like.

The signal processing unit 314 performs face detection on the observer on the basis of the image information supplied from the imaging unit 312, and further identifies the position of the left eye and the right eye (hereinafter, also referred to as "the left and right eyes") on the basis of face detection, and obtains coordinate information of the left and right eyes (left-eye position (XL, YL), right-eye position (XR, YR)). After acquisition of the coordinate information of the left and right eyes, the signal processing unit 314 determines the positional relationship of the left and right eyes of the observer with respect to the display unit 311 using the coordinate information on the left and right eyes and the distance information supplied from the ranging unit 313.

The above-described functions of the signal processing unit 314, such as detection of the face of the observer, detection of the left and right eyes, determination of the positional relationship between the left and right eyes, together with the imaging unit 312 and the ranging unit 313, constitute the detection unit that detects the positional information and the orientation information of the eye of the observer with respect to the display surface of the display unit 311. Note that, even without using the ranging unit 313, it would be possible to detect the distance between the display surface of the display unit 311 and the eye of the observer on the basis of the interval of the left and right eyes, or the like, obtained from the image information from the imaging unit 312. Accordingly, the ranging unit 313 is not an indispensable component. Note that, however, the interval between the left and right eyes differs depending on the observer, and thus, it is difficult to detect the distance with high accuracy on the basis of the interval between the left and right eyes. Therefore, it would be possible to achieve higher distance detection accuracy by using the ranging unit 313.

The signal processing unit 314 not only performs calculation processing of detecting the positional information and orientation information of the eye of the observer with respect to the display surface of the display unit 311 but also performs processing of calculating a distance (hereinafter, referred to as "virtual image distance") from the position of the eye of the observer to the virtual image presentation position where the virtual image is presented (displayed). The focal length of the microlens 322 is determined by the designation by the observer from the input unit 316. At this time, the signal processing unit 314 calculates the virtual image distance on the basis of a focal length of the microlens 322, designated by the observer from the input unit 316. Moreover, the display control unit 315 adjusts the focal length of the microlens 322 so as to achieve the focal length designated by the observer.

The signal processing unit 314 further calculates virtual image information (image information) toward each of the left-eye pixel 323L and the right-eye pixel 323R such that a virtual image may be presented at a position of the virtual distance with the aspect ratio different from the aspect ratio of the display surface of the display unit 311 on the basis of the positional information and orientation information of the eye of the observer, the virtual image distance information, and the image information to be displayed, and supplies the calculated information to the display control unit 315. The display control unit 315 drives the left-eye pixel 323L and the right-eye pixel 323R on the basis of the virtual image information supplied from the signal processing unit 314. The display control unit 315 controls the focal length of the microlens 322 in accordance with the designation by the user from the input unit 316.

Presentation (display) of the virtual image is performed at a position of the virtual image distance, that is, the virtual image presentation position with the drive control by the display control unit 315. That is, the light of the image from the left-eye pixel 323L and the right-eye pixel 323R is focused on the retina of the observer by the microlens 322, and whereby the observer can recognize the image as a virtual image displayed at a presentation position (virtual image distance position) determined by the focal length of the microlens 322.

Figure 27:
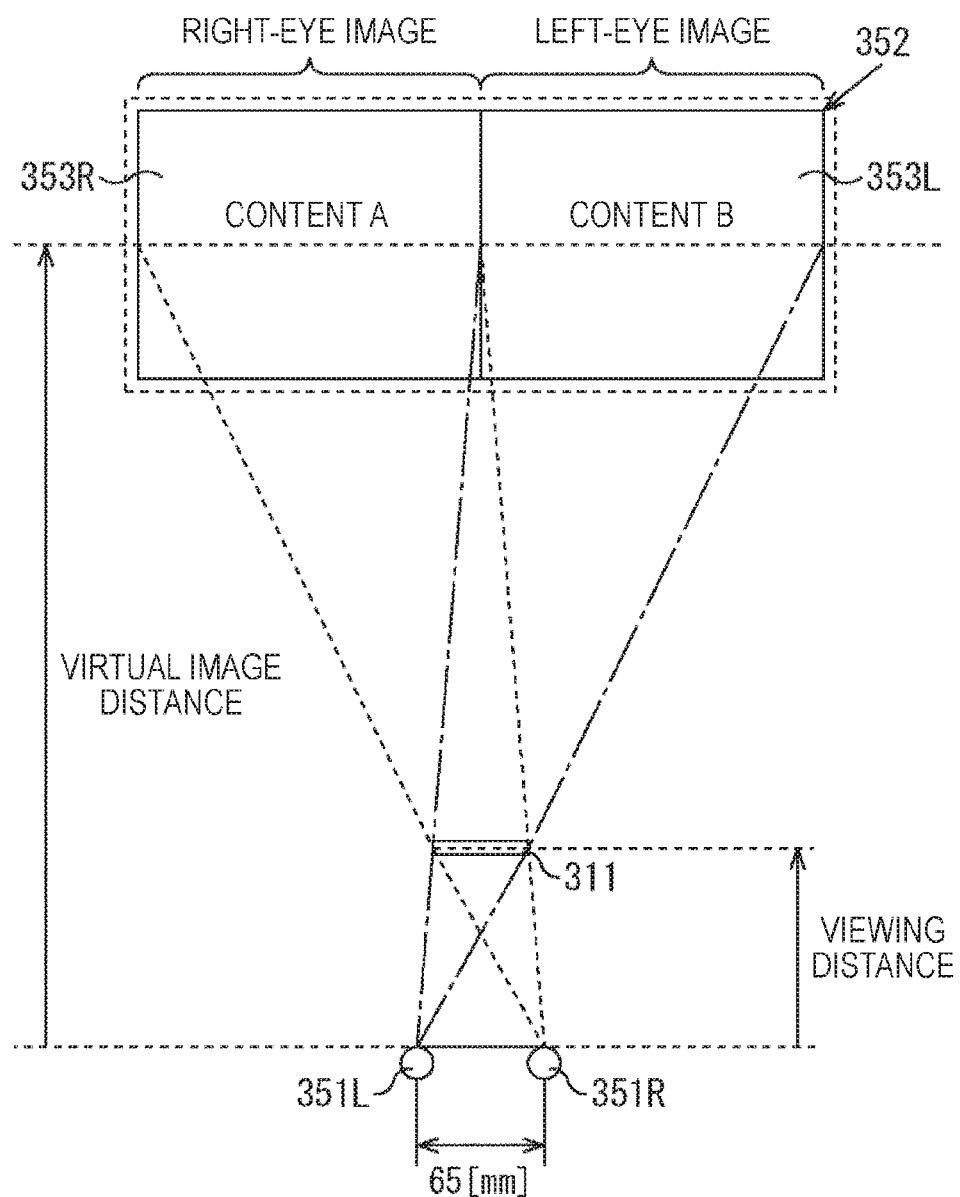
FIG. 27 is a diagram illustrating an example of presenting a virtual image at a position farther than a display surface of the display unit.

FIG. 27 illustrates an example in which the display apparatus 300 presents a virtual image at a position farther (more distant) than the display surface of the display unit 311.

In FIG. 27, a light beam related to a left eye 351L of the observer is illustrated with a one-dot chain line and a light beam related to a right eye 351R is illustrated with a broken line. Moreover, the interval between the left eye 351L and the right eye 351R of the observer (interocular) is assumed to be 65 [mm], for example.

On the display apparatus 300, presentation of the virtual image is executed by signal processing by the signal processing unit 314 and under the display control by the display control unit 315. That is, the display control unit 315 drives the left-eye pixel 323L and the right-eye pixel 323R of the display unit 311 on the basis of the image information generated by the signal processing unit 314 and thereby presenting a virtual image 352 at a presentation position set at a position more distant than the display surface of the display unit 311 depending on the focal length and the viewing distance of the microlens 322.

More specifically, the signal processing unit 314 generates image information in which a left side of the left-eye image and a right side of the right-eye image adjoin with each other. The display control unit 315 drives the left-eye pixel 323L and the right-eye pixel 323R on the basis of the image information generated by the signal processing unit 314 and thereby presenting a virtual image 352 at a presentation position set at a position more distant than the display surface of the display unit 311. That is, the display apparatus 300 displays the virtual image 352 by defining a left-eye screen 353L and a right-eye screen 353R as two screens adjoining with each other in a left-right direction.

It is possible to display an image of same content onto the two screens of the left-eye screen 353L and the right-eye screen 353R. Alternatively, it is possible to display images of different content, for example, as illustrated in FIG. 27, display an image of content A on the right-eye screen 353R and display an image of content B on the left-eye screen 353L. As a display example of the latter case, the left-eye screen 353L can display image information such as map information including a designated point with highlighting, while the right-eye screen 353R can display image information such as weather forecast for each of time zones for the designated point, or image information such as dining/restaurant information of the designated point.

As described above, the display apparatus 300 can present a virtual image at a position farther than the display surface of the display unit 311, and can present a virtual image at a position closer than the display surface of the display unit 311. Moreover, by not providing the microlens 322 with a lens function, it is possible to display a real image (two-dimensional image) on the display surface of the display unit 311.

<Others>

Figure 28:
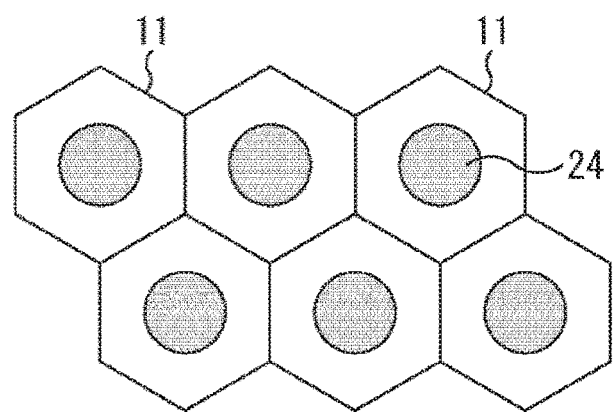
FIG. 28 is a diagram illustrating a modification of a planar shape of a liquid lens.

While each of the above-described embodiments is an example in which the planar shape of the liquid lens 11 is a quadrilateral shape, the planar shape of the liquid lens 11 is not limited to a quadrilateral shape and may be, for example, a regular hexagon shape as illustrated in FIG. 28 so as to arrange the plurality of liquid lenses 11 in a honeycomb arrangement.

Embodiments of the present technology are not limited to the above-described embodiments but can be modified in a variety of ways within a scope of the present technology.

For example, it is possible to employ all of the above-described plurality of embodiments, or an embodiment combining a part of the embodiments.

In addition, effects described herein are provided for purposes of exemplary illustration and are not intended to be limiting. Still other effects in addition to what is described herein may also be contemplated.

Note that the present technology may also be configured as follows.

(1)

A liquid lens including a first electrode and a second electrode, to which a predetermined voltage is applied, in which the second electrode is arranged outside the first electrode in a planar direction, and an insulating film having water repellency is formed on an upper surface of the second electrode.

(2)

The liquid lens according to (1), in which the first electrode and the second electrode are arranged on a same plane.

(3)

The liquid lens according to (1) or (2), further including first and second liquids, one of which is conductive and the other of which is insulative, in which the first liquid is in contact with the first electrode, and the second liquid is in contact with the insulating film on the second electrode and in contact with the first liquid.

(4)

The liquid lens according to (3), in which the first liquid is an insulating liquid, and the second liquid is a conductive liquid.

(5)

The liquid lens according to (4), in which a lipophilic film is formed on an upper surface of a supporting substrate and on an upper surface of the first electrode, no insulating film being formed on both of the surfaces.

(6)

The liquid lens according to (3), in which the first liquid is a conductive liquid, and the second liquid is an insulating liquid.

(7)

The liquid lens according to (6), in which a hydrophilic film is formed on an upper surface of a supporting substrate and on an upper surface of the first electrode, no insulating film being formed on both of the surfaces.

(8)

The liquid lens according to (6) or (7), in which a distance in the planar direction from the insulating film to the first electrode is shorter than a distance in the planar direction from the second electrode to the first electrode.

(9)

The liquid lens according to any of (1) to (8), in which the first electrode and the second electrode are arranged in substantially concentric circles or substantially concentric quadrilateral shapes.

(10)

The liquid lens according to any of (1) to (9), in which the second electrode is divided into a plurality of portions in a circumferential direction.

(11)

The liquid lens according to (10), in which mutually different voltages are applied to the two second electrodes obtained by the division in the circumferential direction.

(12)

The liquid lens according to (10) or (11), in which the first electrode is also divided into a plurality of portions in the circumferential direction.

(13)

The liquid lens according to any of (1) to (12), further including one or more electrodes further outside the second electrode.

(14)

The liquid lens according to (13), further including third and fourth electrodes further outside the second electrode.

(15)

A liquid lens driving method including applying a predetermined voltage to a first electrode and a second electrode of a liquid lens in which the second electrode is arranged outside the first electrode in the planar direction and an insulating film having water repellency is formed on an upper surface of the second electrode.

(16)

The liquid lens driving method according to (15), in which third and fourth electrodes are arranged outside the second electrode of the liquid lens in the planar direction, and the drive control unit selectively applies a predetermined voltage to two electrodes adjacent to each other, from among the first to fourth electrodes.

(17)

An imaging apparatus including a liquid lens that includes a first electrode and a second electrode, to which a predetermined voltage is applied, in which the second electrode is arranged outside the first electrode in a planar direction, and an insulating film having water repellency is formed on an upper surface of the second electrode.

(18)

The imaging apparatus according to (17), in which the liquid lens is at least one lens of a multi-layer lens in which a plurality of lenses is stacked.

(19)

The imaging apparatus according to (17), in which the liquid lens is a microlens of a microlens array.

(20)

The imaging apparatus according to (17), in which the liquid lens is a microlens of a light field camera.

(21)

A display apparatus including a liquid lens that includes a first electrode and a second electrode, to which a predetermined voltage is applied, in which the second electrode is arranged outside the first electrode in a planar direction, and an insulating film having water repellency is formed on an upper surface of the second electrode.

REFERENCE SIGNS LIST

11 Liquid lens
22A First electrode
22B Second electrode
22C Third electrode 22D Fourth electrode
23 Insulating film
24 First liquid (oil)
25 Second liquid (electrolytic solution)
31 Drive control unit
41 Hydrophilic film
100 Imaging apparatus
113 Multi-layer lens structure
121 Lens
140 Imaging apparatus
151 Microlens array substrate
163 Microlens
190 Imaging apparatus
202 Microlens array
300 Display apparatus
311 Display unit
322 Microlens

The invention claimed is:

1. A liquid lens, comprising:
a support substrate;
a first electrode on the support substrate;
a second electrode on the support substrate, wherein the second electrode is outside the first electrode in a planar direction of the support substrate;
circuitry configured to supply voltage to the first electrode and the second electrode;
an insulating film having water repellency, wherein
the insulating film is on an upper surface of the second electrode, and
the insulating film is absent on each of an upper surface of the support substrate and an upper surface of the first electrode;
a first liquid in contact with the first electrode;
a second liquid in contact with each of the first liquid and the insulating film on the second electrode, wherein
the first liquid is an insulating liquid, and
the second liquid is a conductive liquid; and
a lipophilic film on the upper surface of the support substrate and the upper surface of the first electrode.

2. The liquid lens according to claim 1, wherein
a first distance, in the planar direction, from the insulating film to the first electrode is shorter than a second distance, and
the second distance is, in the planar direction, from the second electrode to the first electrode.

3. The liquid lens according to claim 1, wherein the first electrode and the second electrode are in one of substantially concentric circles or substantially concentric quadrilateral shapes.

4. The liquid lens according to claim 1, wherein the second electrode is divided into a first plurality of portions in a circumferential direction.

5. The liquid lens according to claim 4, wherein
the circuitry is further configured to:
supply a first voltage to a first portion of the first plurality of portions of the second electrode; and
supply a second voltage to a second portion of the first plurality of portions of the second electrode, and
the first voltage is different from the second voltage.

6. The liquid lens according to claim 4, wherein the first electrode is divided into a second plurality of portions in the circumferential direction.

7. The liquid lens according to claim 1, further comprising:
a third electrode; and
a fourth electrode, wherein
the third electrode and the fourth electrode are outside the second electrode.

8. A liquid lens driving method, comprising:
applying, by circuitry, voltage to a first electrode and a second electrode of a liquid lens, wherein
the first electrode and the second electrode are on a support substrate of the liquid lens,
the second electrode is outside the first electrode in a planar direction of the support substrate, and
the liquid lens includes:
an insulating film having water repellency, wherein
the insulating film is on an upper surface of the second electrode, and
the insulating film is absent on each of an upper surface of the support substrate and an upper surface of the first electrode,
a first liquid in contact with the first electrode,
a second liquid in contact with each of the first liquid and the insulating film on the second electrode, wherein
the first liquid is an insulating liquid, and
the second liquid is a conductive liquid, and
a lipophilic film on the upper surface of the support substrate and the upper surface of the first electrode; and
driving, by the circuitry, the liquid lens based on the application of the voltage.

9. The liquid lens driving method according to claim 8, further comprising applying, by the circuitry, voltage to two adjacent electrodes of a plurality of electrodes, wherein
the plurality of electrodes includes the first electrode, the second electrode, a third electrode, and a fourth electrode,
the liquid lens further includes the third electrode and the fourth electrode, and
the third electrode and the fourth electrode are outside the second electrode in the planar direction.

10. An imaging apparatus, comprising:
a liquid lens that includes:
a support substrate;
a first electrode on the support substrate;
a second electrode on the support substrate, wherein the second electrode is outside the first electrode in a planar direction of the support substrate;
circuitry configured to supply voltage to the first electrode and the second electrode;
an insulating film having water repellency, wherein
the insulating film is on an upper surface of the second electrode, and
the insulating film is absent on each of an upper surface of the support substrate and an upper surface of the first electrode;
a first liquid in contact with the first electrode;
a second liquid in contact with each of the first liquid and the insulating film on the second electrode, wherein
the first liquid is an insulating liquid, and
the second liquid is a conductive liquid; and
a lipophilic film on the upper surface of the support substrate and the upper surface of the first electrode.

11. The imaging apparatus according to claim 10, further comprising a multi-layer lens, wherein
the multi-layer lens includes a plurality of lenses,
the plurality of lenses is stacked, and
the plurality of lenses includes the liquid lens.

12. The imaging apparatus according to claim 10, further comprising a microlens array, wherein the microlens array includes a microlens which is the liquid lens.

13. The imaging apparatus according to claim 10, further comprising a light field camera, wherein
the light field camera includes a plurality of microlenses, and
the plurality of microlenses includes the liquid lens.

14. A display apparatus, comprising:
a liquid lens that includes:
  a support substrate;
  a first electrode on the support substrate;
  a second electrode on the support substrate, wherein the second electrode is outside the first electrode in a planar direction of the support substrate;
  circuitry configured to supply voltage to the first electrode and the second electrode;
  an insulating film having water repellency, wherein
    the insulating film is on an upper surface of the second electrode, and
    the insulating film is absent on each of an upper surface of the support substrate and an upper surface of the first electrode;
  a first liquid in contact with the first electrode;
  a second liquid in contact with each of the first liquid and the insulating film on the second electrode, wherein
    the first liquid is an insulating liquid, and
    the second liquid is a conductive liquid; and
  a lipophilic film on the upper surface of the support substrate and the upper surface of the first electrode.

\* \* \* \* \*